US012136766B2

(12) United States Patent
Yang et al.

(10) Patent No.: US 12,136,766 B2
(45) Date of Patent: Nov. 5, 2024

(54) PATCH ANTENNA ARRAY

(71) Applicant: QUALCOMM Incorporated, San Diego, CA (US)

(72) Inventors: Taesik Yang, San Diego, CA (US); Jorge Fabrega Sanchez, San Diego, CA (US); Mohammad Ali Tassoudji, San Diego, CA (US); Kevin Hsi-Huai Wang, San Diego, CA (US); Jeongil Jay Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/138,542

(22) Filed: Apr. 24, 2023

(65) Prior Publication Data

US 2023/0261393 A1 Aug. 17, 2023

Related U.S. Application Data

(63) Continuation of application No. 16/379,553, filed on Apr. 9, 2019, now Pat. No. 11,652,301.

(Continued)

(51) Int. Cl.

*H01Q 21/06* (2006.01)
*H01Q 1/22* (2006.01)

(Continued)

(52) U.S. Cl.

CPC ......... *H01Q 21/065* (2013.01); *H01Q 1/2283* (2013.01); *H01Q 5/364* (2015.01); *H01Q 5/385* (2015.01)

(58) Field of Classification Search

CPC ........... H01Q 1/24-38; H01Q 5/30-35; H01Q 21/065

See application file for complete search history.

(56) References Cited

U.S. PATENT DOCUMENTS

| | | | |
|---|---|---|---|
| 4,755,821 A | 7/1988 | Itoh et al. | |
| 5,231,406 A | 7/1993 | Sreenivas | |

(Continued)

FOREIGN PATENT DOCUMENTS

| | | |
|---|---|---|
| CN | 102324620 A | 1/2012 |
| CN | 103531891 A | 1/2014 |

(Continued)

OTHER PUBLICATIONS

Alatan L., et al., "Dual Frequency Bi-Orthogonally Polarized Antenna for GPS Applications", Melecon 2000. 10th. Mediterranean Electro technical Conference, Lemesos, Cyprus, May 29-31, 2000; [Melecon Conferences], New York, NY: IEEE, US, vol. Conf. 10, May 29, 2000 (May 29, 2000), pp. 652-655, XP000988136, ISBN: 978-0-7803-6291-8.

(Continued)

*Primary Examiner* — Hasan Islam

(74) *Attorney, Agent, or Firm* — Holland & Hart LLP/Qualcomm Incorporated

(57) ABSTRACT

Methods, systems, and devices for wireless communication are described. According to one or more aspects, the described apparatus includes one or more stacks of patch radiators (such as patch antennas) comprising at least a first patch radiator and a second patch radiator. The first patch radiator is associated with a low-band frequency; the second patch radiator is associated with a high-band frequency. The first patch radiator and the second patch radiator may overlap a ground plane, which may be asymmetric. Some or all patch radiators in a stack may be rotated relative to the ground plane, such that some or all edge of a patch radiator may be nonparallel with one or more edges of the ground plane. Further, each patch radiator stack may include separate feeds for each of at least two frequencies and two (Continued)

polarizations, and thus at least four feeds (one for each frequency/polarization combination) in total.

20 Claims, 18 Drawing Sheets

Related U.S. Application Data

(60) Provisional application No. 62/785,636, filed on Dec. 27, 2018, provisional application No. 62/656,181, filed on Apr. 11, 2018.

(51) Int. Cl.
*H01Q 5/364* (2015.01)
*H01Q 5/385* (2015.01)

(56) References Cited

U.S. PATENT DOCUMENTS

| | | | |
|---|---|---|---|
| 6,300,906 B1 | 10/2001 | Rawnick et al. | |
| 6,937,206 B2 | 8/2005 | Puente et al. | |
| 7,079,079 B2 | 7/2006 | Jo et al. | |
| 8,269,687 B2 | 9/2012 | Lindmark et al. | |
| 9,172,132 B2 | 10/2015 | Kam et al. | |
| 9,609,530 B2 | 3/2017 | Lea et al. | |
| 10,135,138 B2 | 11/2018 | Puente et al. | |
| 10,193,231 B2 * | 1/2019 | Wallace | H01Q 1/521 |
| 10,741,906 B2 | 8/2020 | Gomez Angulo et al. | |
| 10,741,933 B2 | 8/2020 | Yong et al. | |
| 11,139,588 B2 | 10/2021 | Edwards et al. | |
| 11,652,301 B2 | 5/2023 | Yang et al. | |
| 2005/0110685 A1 | 5/2005 | Frederik Du Toit | |
| 2007/0236390 A1 | 10/2007 | Chang | |
| 2009/0135078 A1 | 5/2009 | Lindmark et al. | |
| 2009/0153404 A1 | 6/2009 | Ryou et al. | |
| 2011/0001682 A1 | 1/2011 | Rao | |
| 2011/0032154 A1 * | 2/2011 | Chung | H01Q 9/0414 343/700 MS |
| 2014/0073337 A1 | 3/2014 | Hong et al. | |
| 2015/0091760 A1 | 4/2015 | Sawa | |
| 2015/0194730 A1 | 7/2015 | Sudo et al. | |
| 2016/0126617 A1 | 5/2016 | Jan et al. | |
| 2019/0020110 A1 | 1/2019 | Paulotto et al. | |
| 2019/0260126 A1 | 8/2019 | Ayala Vazquez et al. | |

FOREIGN PATENT DOCUMENTS

| | | | |
|---|---|---|---|
| CN | 103972664 | A | 8/2014 |
| CN | 103972664 | B | 4/2017 |
| CN | 106816694 | A | 6/2017 |
| EP | 1069646 | A2 | 1/2001 |
| KR | 20100066279 | A | 6/2010 |
| TW | I473347 | B | 2/2015 |
| TW | I540791 | B | 7/2016 |
| WO | 2018169239 | A1 | 9/2018 |

OTHER PUBLICATIONS

International Search Report and Written Opinion—PCT/US2019/026847—ISA/EPO—Jul. 18, 2019.
Kwakye O., et al., "A Dual-Feed Circularly-Polarized Traveling Wave Array Antenna", 2014 Asia-Pacific Microwave Conference, IEICE, Nov. 4, 2014, pp. 1417-1419, XP032750535, [retrieved on Mar. 25, 2015].
Osman A.S., et al., "Modeling of Multiband/Wideband Stack Series Array Antenna Configuration for 5G Application", International Conference on Computer and Communication Engineering, 2016, pp. 349-354.
Taiwan Search Report—108112664—TIPO—Oct. 20. 2022.
Zhai W., et al., "Dual-Band Millimeter-Wave Interleaved Antenna Array Exploiting Low-Cost PCB Technology for High Speed 5G Communication", IEEE MTT-S International Microwave Symposium (IMS), 2016, 4 Pages.

* cited by examiner

PATCH ANTENNA ARRAY

CROSS REFERENCE TO RELATED APPLICATIONS

The present application is a continuation of U.S. patent application Ser. No. 16/379,553 by YANG, et al., entitled "PATCH ANTENNA ARRAY," filed Apr. 9, 2019, which claims priority to U.S. Provisional Patent Application No. 62/656,181 by SANCHEZ, et al., entitled "DUAL-BAND AND DUAL-POLARIZATION PATCH ANTENNA ARRAY," filed Apr. 11, 2018, and U.S. Provisional Patent Application No. 62/785,636 by YANG, et al., entitled "PATCH ANTENNA ARRAY," filed Dec. 27, 2018, each of which is assigned to the assignee hereof and expressly incorporated herein.

BACKGROUND

The following relates generally to wireless communication, and more specifically to a patch antenna array.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), discrete Fourier transform-spread-OFDM (DFT-S-OFDM), single-user (SU) multiple-input multiple-output (MIMO), or multi-user (MU) MIMO. These systems may employ other wireless communication protocols or radio frequency (RF) signals suitable for use in one or more of a wireless personal area network (WPAN), a wireless local area network (WLAN), a wireless wide area network (WWAN), or an internet of things (IOT) network. A wireless multiple-access communications system may include a number of base stations or network access nodes, each simultaneously supporting communication for multiple communication devices, which may be otherwise known as user equipment (UE).

Base stations, UEs, and other wireless communications devices may use antennas to transmit and receive signals on a wireless medium. Antennas may be used to transmit and receive transmissions over different frequencies. The design of antennas in a particular device may impact whether and how well the device may transmit and receive signals across a certain frequency. Different types of systems may operate at different frequencies and using signals with different polarizations, and therefore the antennas for wireless communications devices within a system may be designed based on the operating parameters required for or supported by the system. In at least some cases, it may be desirable for wireless communications devices to include antennas designed to operate at some or all of multiple frequencies and polarizations. It may also be desirable for antennas operating at multiple frequencies and polarizations to exhibit improved gain balance between polarizations.

SUMMARY

The description herein relates to an antenna array, including related methods, systems, devices, and apparatuses. A patch antenna array may be a dual-polarization patch antenna array. Additionally or alternatively, the patch antenna array may be a dual-band patch antenna array.

Some examples may include one or more patch radiators (which may alternatively be referred to, individually or collectively, as patch antennas), such, as for example, a first patch radiator and a second patch radiator. The first patch radiator and the second patch radiator may be configured in a stack (e.g., concentric about a common vertical axis relative to a horizontal ground plane), and an array may include any number of patch radiator stacks. The first patch radiator may be associated with a first frequency band and the second patch radiator may be associated with a second frequency band.

In some cases, a patch antenna array may include at least one patch radiator that is rotated relative to a ground plane for the patch antenna array. For example, the ground plane may be asymmetric, and rotating a patch radiator (e.g., at a forty-five (45) degree angle) may reduce or eliminate a difference in the distance between an edge of the ground plane and (i) an edge of the patch radiator associated with a first polarization (e.g., a horizontal polarization), such as an edge of the patch radiator associated with a feed having the first polarization, and (ii) another edge of the patch radiator associated with a second polarization (e.g., a vertical polarization), such as an edge of the patch radiator associated with a feed having the second polarization. Rotating the patch radiator, and thereby equalizing or at least improving the equalization of the separation distance between edges of the patch radiator respectively associated with the first and second polarization and the edge of the ground plane may improve, for signals radiated by the patch radiator, gain balance between the first and second polarization. Thus, in some cases, one, some, or all edges of a patch radiator may be nonparallel (slanted, angled, rotated) relative to one or more edges of the ground plane. Some or all patch radiators in some or all stacks of an array may be so rotated.

The antenna structure may further include a first feed configured to receive a first signal having a first (e.g., vertical) polarization and associated with the first frequency band, a second feed configured to receive a second signal having a second, orthogonal (e.g., horizontal) polarization and associated with the first frequency band, a third feed configured to receive a third signal having the first polarization and associated with the second frequency band, and a fourth feed configured to receive a fourth signal having the second polarization and associated with the second frequency band. According to one or more one aspects of the present invention, the first frequency band is lower than the second frequency band. The dual-band and dual-polarization patch radiator array may further include two or more filters, each configured to reject signals associated with the first frequency band or the second frequency band from one of the feeds.

As described above, certain examples relate to improved methods, systems, devices, and apparatuses that support dual-band and dual-polarization patch radiator array. For example, an apparatus for wireless communication is described. The apparatus may include a set of patch radiators comprising a first patch radiator associated with a first frequency band and a second patch radiator associated with a second frequency band, a first feed for the set of patch radiators, the first feed configured to receive a first signal having a first polarization and associated with the first frequency band, a second feed for the set of patch radiators, the second feed configured to receive a second signal having a second polarization and associated with the first frequency band, a third feed for the set of patch radiators, the third feed configured to receive a third signal having the first polarization and associated with the second frequency band, and a fourth feed for the set of patch radiators, the fourth feed configured to receive a fourth signal having the second polarization and associated with the second frequency band.

Some examples of the apparatuses described herein may further include a first filter included in the third feed and configured to reject signals associated with the first frequency band, and a second filter include in the fourth feed and configured to reject signals associated with the first frequency band. In some examples of the apparatuses described herein, the first filter and the second filter each comprise a bandpass filter, a high pass filter, or a band stop filter. In some examples of the apparatuses described herein, the first feed and the second feed are configured to supply the first signal and the second signal to the set of patch radiators without filtering.

Some examples of the apparatuses described herein may further include a third filter included in the first feed and configured to reject signals associated with the second frequency band, and a fourth filter include in the second feed and configured to reject signals associated with the second frequency band. In some examples of the apparatuses described herein, the third filter and the fourth filter each comprise a bandpass filter, a low pass filter, or a band stop filter.

In some examples of the apparatuses described herein, the first polarization is orthogonal to the second polarization. In some examples of the apparatuses described herein, the first polarization is a vertical polarization, and the second polarization is a horizontal polarization. In some examples of the apparatuses described herein, the first frequency band is lower in frequency than the second frequency band. In some examples of the apparatuses described herein, the first patch radiator is physically coupled with the first feed and the second feed, and the second patch radiator is physically coupled with the third feed and the fourth feed.

Some examples of the apparatuses described herein may further include a third patch radiator in the set of patch radiators, the third patch radiator capacitively coupled with the first patch radiator and the second patch radiator. In some examples of the apparatuses described herein, the first patch radiator and the second patch radiator are disposed in a stacked configuration.

Some examples of the apparatuses described herein may further include a third patch radiator in the set of patch radiators, the third patch radiator disposed in the stacked configuration. In some examples of the apparatuses described herein, the first patch radiator and the second patch radiator are concentric about a common axis that is orthogonal to a planar surface of the first patch radiator. In some examples of the apparatuses described herein, the first patch radiator and the second patch radiator are coplanar.

Methods of wireless communication are described. For example, a method may include receiving, at a set of patch radiators, a first signal having a first polarization and associated with a first frequency band, receiving, at the set of patch radiators, a second signal having a second polarization and associated with the first frequency band, receiving, at the set of patch radiators, a third signal having the first polarization and associated with a second frequency band, receiving, at the set of patch radiators, a fourth signal having the second polarization and associated with the second frequency band, and transmitting, using the set of patch radiators, a signal based on the first signal and the second signal, the third signal and the fourth signal, or a combination thereof.

Apparatuses for wireless communication are described. For example, an apparatus may include a processor, memory in electronic communication with the processor, and instructions stored in the memory. The instructions may be executable by the processor to cause the apparatus to receive, at a set of patch radiators, a first signal having a first polarization and associated with a first frequency band, receive, at the set of patch radiators, a second signal having a second polarization and associated with the first frequency band, receive, at the set of patch radiators, a third signal having the first polarization and associated with a second frequency band, receive, at the set of patch radiators, a fourth signal having the second polarization and associated with the second frequency band, and transmit, using the set of patch radiators, a signal based on the first signal and the second signal, the third signal and the fourth signal, or a combination thereof.

As another example, an apparatus for wireless communication may include means for receiving, at a set of patch radiators, a first signal having a first polarization and associated with a first frequency band, means for receiving, at the set of patch radiators, a second signal having a second polarization and associated with the first frequency band, means for receiving, at the set of patch radiators, a third signal having the first polarization and associated with a second frequency band, means for receiving, at the set of patch radiators, a fourth signal having the second polarization and associated with the second frequency band, and means for transmitting, using the set of patch radiators, a signal based on the first signal and the second signal, the third signal and the fourth signal, or a combination thereof.

Non-transitory computer-readable media storing code for wireless communication are described. For example, code may include instructions executable by a processor to receive, at a set of patch radiators, a first signal having a first polarization and associated with a first frequency band, receive, at the set of patch radiators, a second signal having a second polarization and associated with the first frequency band, receive, at the set of patch radiators, a third signal having the first polarization and associated with a second frequency band, receive, at the set of patch radiators, a fourth signal having the second polarization and associated with the second frequency band, and transmit, using the set of patch radiators, a signal based on the first signal and the second signal, the third signal and the fourth signal, or a combination thereof.

Some examples of the method, apparatuses, and non-transitory computer-readable medium described herein may further include operations, features, means, or instructions for filtering the third signal and the fourth signal prior to receiving the third signal and the fourth signal at the set of patch radiators.

In some examples of the method, apparatuses, and non-transitory computer-readable medium described herein, filtering the third signal and the fourth signal may include operations, features, means, or instructions for passing the third signal through a first bandpass filter configured to reject signals associated with the first frequency band and passing the fourth signal through a second bandpass filter configured to reject signals associated with the first frequency band.

In some examples of the method, apparatuses, and non-transitory computer-readable medium described herein, filtering the third signal and the fourth signal may include operations, features, means, or instructions for passing the third signal through a first high pass filter configured to reject signals associated with the first frequency band and passing the fourth signal through a second high pass filter configured to reject signals associated with the first frequency band.

In some examples of the method, apparatuses, and non-transitory computer-readable medium described herein, filtering the third signal and the fourth signal may include operations, features, means, or instructions for passing the third signal through a first band stop filter configured to reject signals associated with the first frequency band and passing the fourth signal through a second band stop filter configured to reject signals associated with the first frequency band.

Some examples of the method, apparatuses, and non-transitory computer-readable medium described herein may further include operations, features, means, or instructions for filtering the first signal and the second signal prior to receiving the first signal and the second signal at the set of patch radiators.

In some examples of the method, apparatuses, and non-transitory computer-readable medium described herein, filtering the first signal and the second signal may include operations, features, means, or instructions for passing the first signal through a third filter configured to reject signals associated with the second frequency band and passing the second signal through a fourth filter configured to reject signals associated with the second frequency band.

In some examples of the method, apparatuses, and non-transitory computer-readable medium described herein, filtering the first signal and the second signal may include operations, features, means, or instructions for passing the first signal through a first low pass filter configured to reject signals associated with the second frequency band and passing the second signal through a second low pass filter configured to reject signals associated with the second frequency band.

As described above, certain examples relate to improved methods, systems, devices, and apparatuses that support dual-polarization patch radiator array. For example, an apparatus for wireless communication is described. The apparatus may include a ground plane, where a first edge of the ground plane is perpendicular to and longer than a second edge of the ground plane, and an array of patch radiator stacks overlapping the ground plane. In some cases, the ground plane may be at (e.g., formed in) a first layer of a printed circuit board (PCB). In some cases, a first patch radiator stack in the array comprises a first patch radiator having a first edge that is nonparallel with the first edge of the ground plane and with the second edge of the ground plane. In some cases, the first patch radiator may be at (e.g., formed in) a second layer of the PCB.

In some examples of the apparatuses described herein, at least four edges of the first patch radiator are nonparallel with the first edge of the ground plane and with the second edge of the ground plane. In some examples of the apparatuses described herein, the first edge of the first patch radiator is oriented at a forty-five (45) degree angle relative to the first edge of the ground plane and relative to the second edge of the ground plane.

Some examples of the apparatuses described herein may further include a second patch radiator having a first edge that is nonparallel with the first edge of the ground plane and with the second edge of the ground plane. In some examples, the second patch radiator may be at (e.g., formed in) a third layer of the PCB. In some examples of the apparatuses described herein, the first edge of the second patch radiator is parallel with the first edge of the first patch radiator. In some examples of the apparatuses described herein, each edge of the second patch radiator is nonparallel with the first edge of the ground plane and with the second edge of the ground plane.

In some examples of the apparatuses described herein, each edge of the second patch radiator is nonparallel with each edge of the ground plane. In some examples of the apparatuses described herein, a second edge of the first patch radiator is parallel with the first edge of the ground plane.

In some examples of the apparatuses described herein, the second edge of the first patch radiator is shorter than the first edge of the first patch radiator, a midpoint of the first edge of the first patch radiator is separated from the first edge of the ground plane by a first distance, and a midpoint of the second edge of the first patch radiator is separated from the first edge of the ground plane by a second distance that is less than the first distance.

In some examples of the apparatuses described herein, a third edge of the first patch radiator is parallel with the second edge of the ground plane. Some examples of the apparatuses described herein may further include a third patch radiator and a second patch radiator both overlapping with the first patch radiator. In some cases, the second patch radiator may be at (e.g., formed in) a third layer of the PCB. In some cases, the third patch radiator may be at (e.g., formed in) a fourth layer of the PCB. In some cases, a first edge of the third patch radiator is parallel with the first edge of the first patch radiator.

Some examples of the apparatuses described herein may further include a set of parasitic patch radiators that are coplanar with the third patch radiator, the third patch radiator disposed between at least two parasitic patch radiators of the set. In some examples, the set of parasitic patch radiators may be at (e.g., formed in) the fourth layer of the PCB. Some examples of the apparatuses described herein may further include a set of parasitic patch radiators, each patch radiator of the set having a first edge that is parallel with the first edge of the first patch radiator. In some examples, the set of parasitic patch radiators may be at (e.g., formed in) a fourth layer of the PCB.

In some examples of the apparatuses described herein, each parasitic patch radiator of the set has a second edge that is parallel with the first edge of the ground plane. In some examples of the apparatuses described herein, each parasitic patch radiator of the set has at least four edges that are nonparallel with the first edge of the ground plane and with the second edge of the ground plane.

Some examples of the apparatuses described herein may further include a second patch radiator stack in the array that is rotated one-hundred and eighty (180) degrees relative to the first patch radiator stack in the array. some examples of the apparatuses described herein, the first edge of the first patch radiator is nonparallel with an axis that intersects a centroid of the first patch radiator of the first patch radiator stack and a centroid of at least one patch radiator of the second patch radiator stack.

Some examples of the apparatuses described herein may further include a first feed configured to receive a first signal having a first polarization and associated with a first frequency band, a second feed configured to receive a second signal having a second polarization and associated with the first frequency band, a third feed configured to receive a third signal having the first polarization and associated with a second frequency band, and a fourth feed configured to receive a fourth signal having the second polarization and associated with the second frequency band.

Some examples of the apparatuses described herein may further include a first low pass filter included in the first feed and configured to reject signals associated with the second frequency band, a second low pass filter include in the second feed and configured to reject signals associated with the second frequency band, a first high pass filter included in the third feed and configured to reject signals associated with the first frequency band, and a second high pass filter include in the fourth feed and configured to reject signals associated with the first frequency band.

Some examples of the apparatuses described herein may further include a first notch filter included in the first feed and configured to extract signals associated with the first frequency band, a second notch filter include in the second feed and configured to extract signals associated with the first frequency band, a third notch filter included in the third feed and configured to extract signals associated with the second frequency band, and a fourth notch filter include in the fourth feed and configured to extract signals associated with the second frequency band. In some examples of the apparatuses described herein, the first feed and the second feed are capacitively coupled with the first patch radiator. In some examples of the apparatuses described herein, the third feed and the fourth feed are capacitively coupled with the second patch radiator. In some examples of the apparatuses described herein, the second patch radiator may be at (e.g., formed in) a third layer of the PCB Methods of wireless communication are described. For example, a method may include receiving, at a stack of patch radiators that comprises at least one patch radiator having an edge that is nonparallel with at least two edges of a ground plane, a first signal having a first polarization and associated with a first frequency band via a first feed, receiving, at the stack of patch radiators, a second signal having a second polarization and associated with the first frequency band via a second feed, receiving, at the stack of patch radiators, a third signal having the first polarization and associated with a second frequency band via a third feed, receiving, at the stack of patch radiators, a fourth signal having the second polarization and associated with the second frequency band via a fourth feed, and transmitting, using the stack of patch radiators, a signal based on the first signal and the second signal, the third signal and the fourth signal, or a combination thereof.

Apparatuses for wireless communication are described. For example, an apparatus may include a processor, memory in electronic communication with the processor, and instructions stored in the memory. The instructions may be executable by the processor to cause the apparatus to receive, at a stack of patch radiators that comprises at least one patch radiator having an edge that is nonparallel with at least two edges of a ground plane, a first signal having a first polarization and associated with a first frequency band via a first feed, receive, at the stack of patch radiators, a second signal having a second polarization and associated with the first frequency band via a second feed, receive, at the stack of patch radiators, a third signal having the first polarization and associated with a second frequency band via a third feed, receive, at the stack of patch radiators, a fourth signal having the second polarization and associated with the second frequency band via a fourth feed, and transmit, using the stack of patch radiators, a signal based on the first signal and the second signal, the third signal and the fourth signal, or a combination thereof.

As another example, an apparatus for wireless communication may include means for receiving, at a stack of patch radiators that comprises at least one patch radiator having an edge that is nonparallel with at least two edges of a ground plane, a first signal having a first polarization and associated with a first frequency band via a first feed, means for receiving, at the stack of patch radiators, a second signal having a second polarization and associated with the first frequency band via a second feed, means for receiving, at the stack of patch radiators, a third signal having the first polarization and associated with a second frequency band via a third feed, means for receiving, at the stack of patch radiators, a fourth signal having the second polarization and associated with the second frequency band via a fourth feed, and means for transmitting, using the stack of patch radiators, a signal based on the first signal and the second signal, the third signal and the fourth signal, or a combination thereof.

Non-transitory computer-readable media storing code for wireless communication are described. For example, code may include instructions executable by a processor to receive, at a stack of patch radiators that comprises at least one patch radiator having an edge that is nonparallel with at least two edges of a ground plane, a first signal having a first polarization and associated with a first frequency band via a first feed, receive, at the stack of patch radiators, a second signal having a second polarization and associated with the first frequency band via a second feed, receive, at the stack of patch radiators, a third signal having the first polarization and associated with a second frequency band via a third feed, receive, at the stack of patch radiators, a fourth signal having the second polarization and associated with the second frequency band via a fourth feed, and transmit, using the stack of patch radiators, a signal based on the first signal and the second signal, the third signal and the fourth signal, or a combination thereof.

Some examples of the method, apparatuses, and non-transitory computer-readable medium described herein may further include operations, features, means, or instructions for passing the first signal through a first low pass filter and a first bandpass filter both configured to reject signals associated with the second frequency band, passing the second signal through a second low pass filter and a second bandpass filter both configured to reject signals associated with the second frequency band, passing the third signal through a first high pass filter and a third bandpass filter both configured to reject signals associated with the first frequency band, and passing the fourth signal through a second high pass filter and a fourth bandpass filter both configured to reject signals associated with the first frequency band.

In some examples of the method, apparatuses, and non-transitory computer-readable medium described herein, filtering the third signal and the fourth signal may include operations, features, means, or instructions for passing the third signal through a first bandpass filter configured to reject signals associated with the first frequency band and passing the fourth signal through a second bandpass filter configured to reject signals associated with the first frequency band.

As described above, certain examples relate to improved methods, systems, devices, and apparatuses that support dual-polarization patch radiator array. For example, an antenna system for wireless communication is described. The antenna system may include first radiating means for radiating in a first frequency band and disposed above a rectangular ground plane, and second radiating means for radiating in a second frequency band and disposed above the first radiating means in a stacked configuration. In some cases, the rectangular ground plane may be disposed in (e.g., formed in) a first layer of a PCB, the first radiating means may be disposed in (e.g., formed in) a second layer of the PCB, and the second radiating means may be disposed in (e.g., formed in) a third layer of the PCB. In some cases, each of the first radiating means and the second radiating means comprises at least one edge that is angled relative to both the first edge of the rectangular ground plane and the second edge of the rectangular ground plane.

Some examples of the apparatuses described herein may further include third radiating means for radiating in the second frequency band and disposed above the second radiating means in the stacked configuration, at least one edge of the third radiating means being angled relative to both the first edge of the rectangular ground plane and the second edge of the rectangular ground plane, and a plurality of parasitic radiating means for radiating in the first frequency band and coplanar with the third radiating means, at least one edge of the each parasitic radiating means in the plurality being angled relative to both the first edge of the rectangular ground plane and the second edge of the rectangular ground plane. In some examples, the third radiating means and the plurality of parasitic radiating means may be disposed in (e.g., formed in) a fourth layer of the PCB.

As described above, certain examples relate to improved methods, systems, devices, and apparatuses that support dual-polarization patch radiator array. For example, an apparatus for wireless communication is described. The apparatus may include a set of patch radiators comprising a first patch radiator associated with a first frequency band and a second patch radiator associated with a second frequency band that is higher than the first frequency band. In some cases, the first patch radiator and the second patch radiator are disposed in a stacked configuration. The apparatus may include a first feed for the set of patch radiators, the first feed configured to receive a first signal having a first polarization and associated with the first frequency band, a second feed for the set of patch radiators, the second feed configured to receive a second signal having a second polarization and associated with the first frequency band, a third feed for the set of patch radiators, the third feed configured to receive a third signal having the first polarization and associated with the second frequency band, and a fourth feed for the set of patch radiators, the fourth feed configured to receive a fourth signal having the second polarization and associated with the second frequency band.

Some examples of the apparatuses described herein may further include a third patch radiator in the set of patch radiators, the third patch radiator disposed in the stacked configuration and capacitively coupled with at least the second patch radiator. In some examples of the apparatuses described herein, the first patch radiator and the second patch radiator are concentric about a common axis that is orthogonal to a planar surface of the first patch radiator.

In some examples of the apparatuses described herein, the first polarization is orthogonal to the second polarization. Some examples of the apparatuses described herein may further include a ground plane, where the first patch radiator comprise an edge that is oriented at a forty-five (45) degree angle relative to at least one edge of the ground plane.

DETAILED DESCRIPTION

Figure 1:
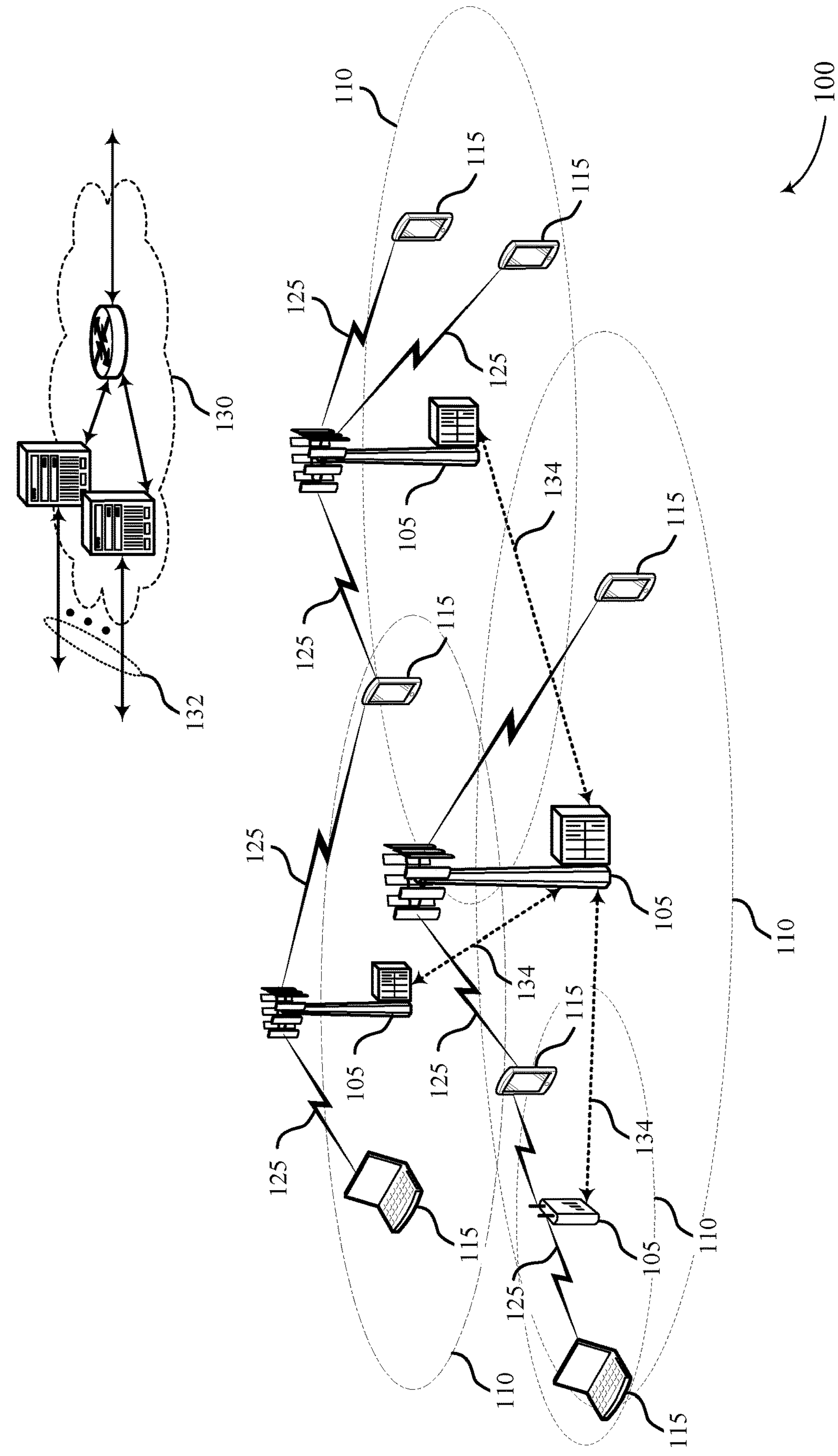
FIG. 1 illustrates an example of a wireless communications system that supports an antenna array in accordance with aspects of the present disclosure.

Some fifth generation (5G) network devices may operate in multiple frequency bands (e.g., both the 28 GHz and 39 GHz frequency bands). Moreover, 5G network devices may support at least two polarizations, which may be orthogonal to one another (e.g., horizontal and vertical polarizations). Thus, it would be useful to design an antenna that could be used with multiple frequency bands and/or multiple polarizations, including with improved gain balance between polarizations.

The described devices and techniques utilize one or more patch radiators (which may alternatively be referred to, either individually or collectively, as patch antennas). For example, an array may include a first patch radiator and a second patch radiator. The first patch radiator and the second patch radiator, along with any number of other patch radiators, may be configured in a stack (e.g., stacked vertically a horizontal ground plane), and an array may include any number of such patch radiator stacks. The first patch radiator may be associated with a first frequency band and the second patch radiator may be associated with a second frequency band. Additional patch radiators in a stack may be associated with one or both of the frequency bands, and may in some cases include any number of parasitic elements (or parasitic patch antennas or radiators).

In some cases, at least one patch radiator in a stack or an array may be rotated relative to a ground plane for the stack or array. For example, the ground plane may be asymmetric (e.g., rectangular and oblong, with one edge longer than another), and rotating a patch radiator (e.g., at a forty-five

(45) degree angle) may reduce or eliminate a difference in the distance between an edge of the ground pan and (i) an edge of the patch radiator associated with a first polarization (e.g., a horizontal polarization), such as an edge of the patch radiator associated with a feed having the first polarization, and (ii) another edge of the patch radiator associated with a second polarization (e.g., a vertical polarization), such as an edge of the patch radiator associated with a feed having the second polarization. Rotating the patch radiator, and thereby equalizing or at least improving the equalization of the separation distance between edges of the patch radiator respectively associated with the first and second polarization and the edge of the ground plane may improve, for signals radiated by the patch radiator, gain balance between the first and second polarization. Thus, in some cases, one, some, or all edges of a patch radiator may be nonparallel (slanted, angled, rotated) relative to one or more edges of the ground plane. Some or all patch radiators in some or all stacks of an array may be so rotated.

Further, in some cases, a rotated patch radiator may have one or more corners chopped to avoid the corner or other aspects of the patch radiator being located undesirably close to the edge of the ground plane (e.g., to mitigate or alleviate any undesired effect from the edge of the ground plane. Chopping the corner of a rotated patch radiator may yield an additional edge of the rotated patch radiator (e.g., an edge shorter than a nonparallel, slanted edge) that is parallel to the edge of the ground plane.

Further, 5G network devices may perform communications using a phased patch radiator array. Some phased patch radiator arrays in such systems may support dual-feed and dual-polarization signaling using two dual-band ports, where each port is associated with a particular polarization. Thus, each port may be configured to receive a dual-band feed associated with both high-band and low-band frequencies, and a diplexer may be required to split a such a dual-band feed. The use of a diplexer may introduce loss into the signal path and increase the physical size of an antenna structure. Other phased patch radiator arrays in some systems may support dual-feed and dual-polarization signaling using separate, interleaved (e.g., not stacked) patch radiators, which also may increase the physical size of an antenna structure.

In contrast, as described herein, a patch radiator structure (e.g., a dual-band and dual-polarization patch radiator structure) may include at least a first patch radiator and a second patch. In some cases, the first patch radiator may receive feeds associated with low-band frequencies, and the second patch radiator may receive feeds associated with high-band frequencies. In some examples, the first patch radiator may receive a first feed associated with a low-band frequency and having a first (e.g., vertical) polarization, and a second feed associated with a low-band frequency and having a second, orthogonal (e.g., horizontal) polarization. Further, the second patch radiator may receive a third feed associated with a high-band frequency and having the first (e.g., vertical) polarization, and a fourth feed associated with a high-band frequency and having the second (e.g., horizontal) polarization. In some cases, the first patch radiator and the second patch radiator may be disposed in (e.g., formed in) a stacked configuration. For example, the first patch radiator and the second patch radiator may be concentric about a common axis that is orthogonal to a planar surface of the first patch radiator. In some alternative examples, the first patch radiator and the second patch radiator may be coplanar.

The patch radiator structure may further include filters on the high-band feeds, with the filters configured to reject low-band frequencies. In one example, the patch radiator structure may include a first filter associated with the third feed and a second filter associated with the fourth feed. As one example, the first filter may be configured to reject low-band frequencies from a first signal having a vertical polarization and associated with a high-band frequency. Additionally, the second filter may be configured to reject low-band frequencies from a second signal having a horizontal polarization and associated with a high-band frequency. In some examples, the first filter and the second filter may be notch filters, bandpass filters, high pass filters, band stop filters, or any filter designed to reject low-band frequency signals.

In some cases, signals received via the low-band feeds (e.g., the first feed and the second feed) may be unfiltered when they are received at the first patch radiator. That is, the low-band feeds may impart no additional filtering to signals received thereby. Alternatively, the low-band feeds may include filters which are configured to reject high-band frequencies. For example, the patch radiator structure may include a first filter configured to reject high-band frequencies from a first signal having a vertical polarization and associated with a low-band frequency. Additionally, the patch radiator structure may include a second filter configured to reject high-band frequencies from a second signal having a horizontal polarization and associated with a low-band frequency. In some examples, the filters configured to reject high-band frequencies may be notch filters, bandpass filters, low pass filters, band stop filters, or any filter designed to reject high-band frequency signals. In some case, a single low-band or high-band feed may include multiple filters, such as a low pass or high pass filter and a bandpass (e.g., notch) filter.

Aspects of the disclosure are initially described in the context of a wireless communications system. Aspects of the disclosure are further illustrated by and described with reference to apparatus diagrams, system diagrams, and flowcharts that relate to a dual-band and dual-polarization patch radiator array.

FIG. 1 illustrates an example of a wireless communications system 100 that supports an antenna array in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may be called forward link transmissions while uplink transmissions may be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, medical devices, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in the range of 300 MHz to 300 GHz in some examples. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, the millimeter band may generically refer to frequencies not strictly corresponding to millimeter wavelengths, such as, for example, bands in the 20 GHz range. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. In some cases, the base station 105 may include antenna structures designed to support dual-band and dual-polarization feeds.

For example, the base stations 105 may include a first patch radiator associated with a first frequency band (such as low-band frequencies) and a second patch radiator associated with a second frequency band (such as high-band frequencies). Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a “system bandwidth” of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., “in-band” deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples of the wireless communications system 100, the base stations 105 and/or the UEs 115 may include antenna structures designed to support dual-band and dual-polarization feeds. For example, the base stations 105 and/or the UEs 115 may include a set of patch radiators (patch antennas) which further includes a first patch radiator and a second patch radiator. As used herein, the descriptors “patch antenna” and “patch radiator” may be used interchangeably, where each of the descriptor may relate to a portion of an antenna array of a UE 115 and/or a base station 105. According to one or more aspects, the first patch radiator and the second patch radiator may be overlapping a ground plane. The ground plane may be asymmetric. For example, the ground plane may be rectangular, and a first edge of the ground plane may be perpendicular to and longer than a second edge of the ground plane. In some cases, multiple patch radiator stacks may be included in an array of patch radiator stacks overlapping the ground plane. At least one patch radiator stack in the array may include at least one patch radiator that is rotated relative to the ground plane, such that the rotated patch radiator has at least a first edge that is nonparallel with (slanted, angled, at an angular offset relative to) the first edge of the ground plane and with the second edge of the ground plane. This may beneficially improve gain balance between signals with different polarizations, which may be associated with (e.g., fed to) different edges of the patch radiator, among other benefits. In some cases, the first edge of the rotated patch radiator, which may be referred to as a first patch radiator, may be oriented at a forty-five (45) degree angle relative to the first edge of the ground plane and relative to the second edge of the ground plane. In some cases, all edges of the rotated patch radiator may be nonparallel with one or more edges of the ground plane. In some cases, one or more corners of the rotated patch radiator may be chopped (trimmed), and each chopped corner may result in an additional edge (e.g., an edge shorter than at least one nonparallel edge) that is parallel with a proximate (nearest) edge of the ground plane.

In some cases, the first patch radiator is associated with a first frequency band (such as low-band frequencies) and the second patch radiator associated with a second frequency band (such as high-band frequencies). That is, the first frequency band may be lower than the second frequency band. In some cases, the first patch radiator may be configured to receive a first signal having a first (e.g., vertical) polarization and associated with the first frequency band, and a second signal having a second, orthogonal (e.g., horizontal) polarization and associated with the first frequency band. Further, the second patch radiator may be configured to receive a third signal having the first (e.g., vertical) polarization and associated with the second frequency band, and a fourth signal having the second (e.g., horizontal) polarization and associated with the second frequency band. Various examples of such antenna structures including the first patch radiator and the second patch radiator are described further below.

Figure 2:
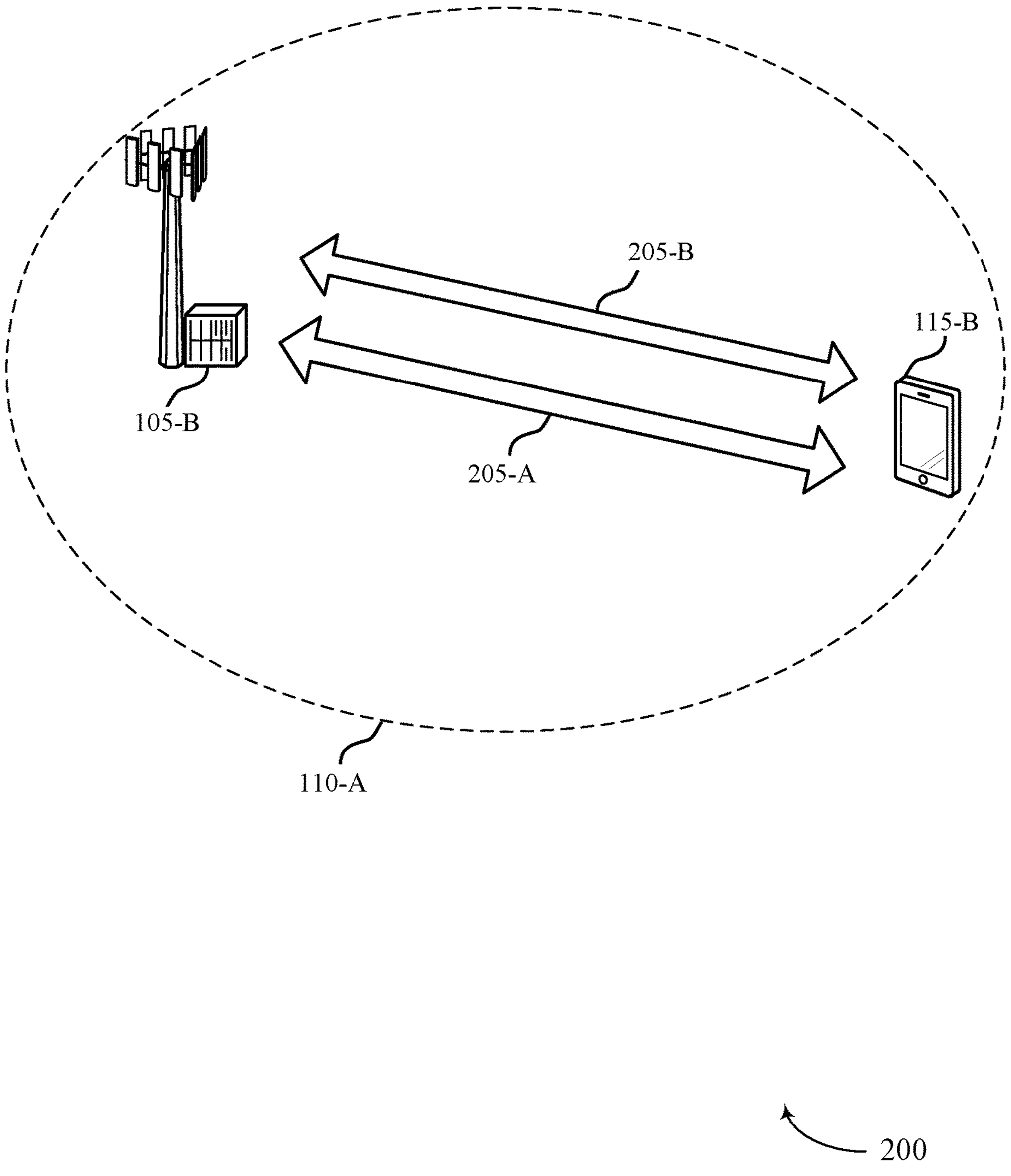
FIG. 2 illustrates an example of a wireless communications system that supports an antenna array in accordance with aspects of the present disclosure.

FIG. 2 illustrates an example of a wireless communications system 200 that supports an antenna array in accordance with aspects of the present disclosure. In some examples, the wireless communications system 200 may implement aspects of wireless communications system 100. In some examples, the wireless communications system 200 may include a base station 105-*a* and UE 115-*a*, which may be examples of the corresponding devices as described with reference to FIG. 1. UE 115-*a* may communicate with the base station 105-*a* within a coverage area 110-*a*.

In some examples, the base station 105-*a* and the UE 115-*a* may include dual-band and dual-polarization patch radiators. The base station 105-*a* and the UE 115-*a* may utilize the patch radiators to perform uplink and downlink communication in a first frequency band 205-*a*, a second frequency band 205-*b*, or in both frequency bands 205-*a*, 205-*b* (dual-band). For example, the base station 105-*a* and the UE 115-*a* may include dual-band and dual-polarization patch radiators configured with respective feeds for receiving a first signal, a second signal, a third signal, and a fourth signal.

In some cases, the patch radiators may overlap a ground plane, where a first edge of the ground plane is perpendicular to and longer than a second edge of the ground plane. In some cases, the ground plane may be at (e.g., formed in) a first layer of a printed circuit board (PCB). The patch radiators may include an array of patch radiator stacks overlapping the ground plane. In some cases, a first patch radiator stack in the array comprises a first patch radiator having a first edge that is nonparallel with the first edge of the ground plane and with the second edge of the ground plane. In some cases, the first patch radiator may be at (e.g., formed in) a second layer of the PCB.

Each patch radiator may include four edges. At least four edges of a patch radiator may be nonparallel with the first edge of the ground plane and with the second edge of the ground plane. In some cases, the first edge of the patch radiator may be oriented at a forty-five (45) degree angle relative to the first edge of the ground plane and relative to the second edge of the ground plane.

In some cases, the first signal may be associated with low-band frequencies and may have a first (e.g., vertical) polarization, the second signal may be associated with low-band frequencies and may have a second, orthogonal (e.g., horizontal) polarization, the third signal may be associated with high-band frequencies and may have the first (e.g., vertical) polarization, and the fourth signal may be associated with high-band frequencies and may have the second (e.g., horizontal) polarization. In some cases, the base station 105-*a* (or the UE 115-*a*) may transmit a signal based on one or more of the received signals. For example, the base station 105-*a* or UE 115-*a* may transmit a low-band signal based on the first and second signals or may transmit a high-band signal based on the third and fourth signals. As another example, the base station 105-*a* may transmit a dual-band signal based on the first, second, third, and fourth signals. In some cases, the UE 115-*a* or base station 105-*a* may receive multiple instances of one or more of the signals and the base station 105-*a* or UE 115-*a* may utilize a plurality of patch radiator arrays to perform beamforming to communicate with the UE 115-*a*.

The high-band feeds for the patch radiator arrays at the base station 105-*a* and/or the UE 115-*a* may include a first filter and a second filter configured to reject signals associated with low-band frequencies. For example, the first filter and the second filter may be notch filters, bandpass filters, high pass filters, band stop filters, or any filter designed to reject low-band frequency signals. In some cases, the low-band feeds for the patch radiator arrays at the base station 105-*a* and/or the UE 115-*a* may not include any filters, or may include a third filter and a fourth filter configured to reject signals associated with high-band frequencies.

Figure 3:
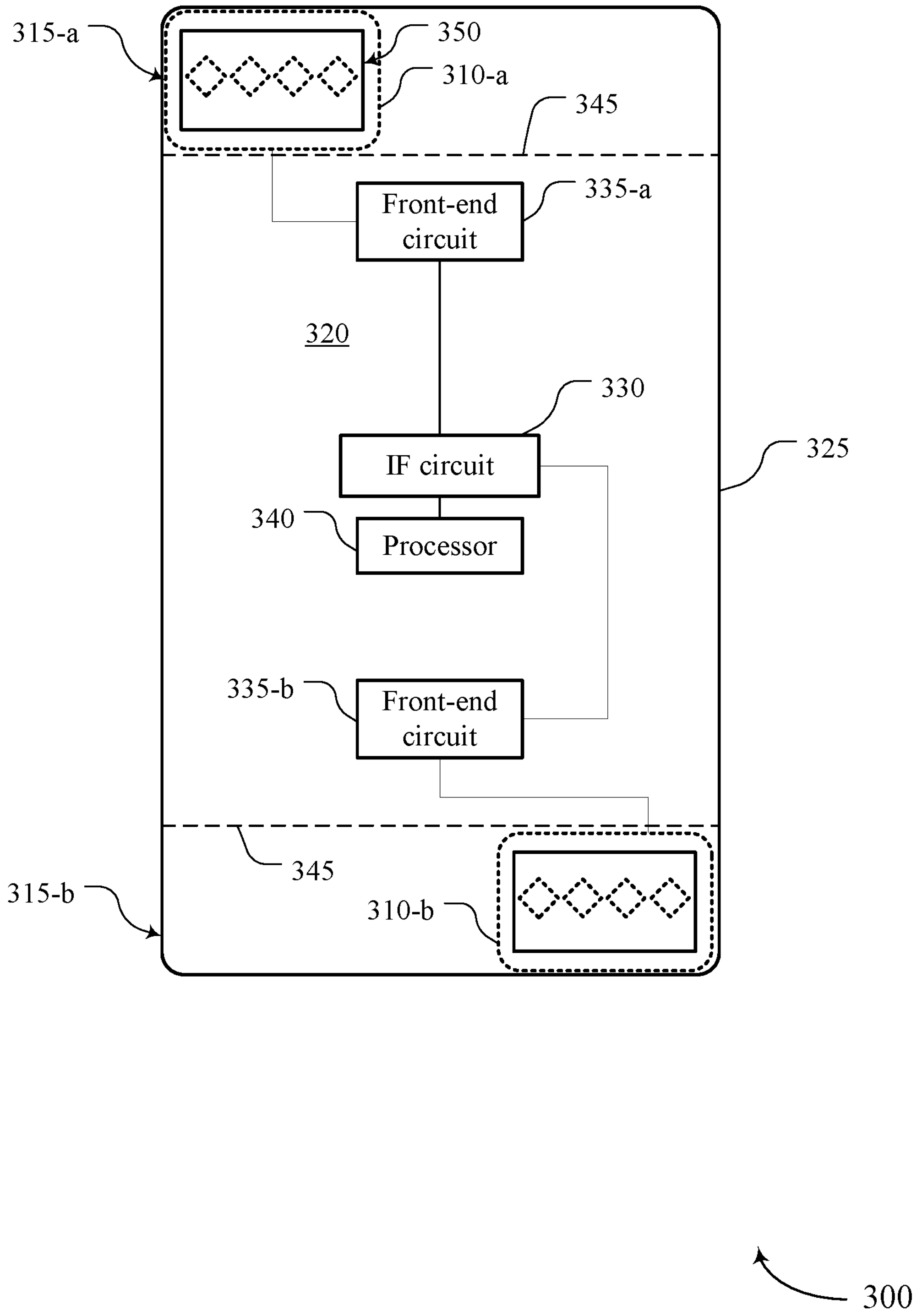
FIG. 3 illustrates an example of a printed circuit board (PCB) layout that supports methods for wireless communications in accordance with aspects of the present disclosure.

FIG. 3 illustrates an example of a PCB layout 300 that supports an antenna array in accordance with aspects of the present disclosure. According to one or more aspects of the present disclosure, a UE such as a mobile device may include a top cover, a display layer, one or more PCBs (such as one or more PCBs in accordance with PCB layout 300), and a bottom cover. The one or more PCBs may be configured to include one or more antennas configured to facilitate bi-directional communication between the mobile device and one or more other devices, including other wireless communication devices.

As depicted in FIG. 3, the PCB layout 300 includes a main portion 320 and two antenna systems 310 (such as antenna system 310-*a* and antenna system 310-*b*). In the example shown, the antenna systems 310 are disposed at opposite ends 315 (such as a first end 315-*a* and a second end 315-*b*) of the PCB layout 300, and thus, in this example, of a mobile device (such as a UE 115, or a housing of the UE 115). The main portion 320 may include a PCB 325 that includes front-end circuits 335 (also called a radio frequency (RF) circuit), an intermediate-frequency (IF) circuit 330, and a processor 340. The front-end circuits 335 may be configured to provide signals to be radiated to the antenna systems 310 and to receive and process signals that are received by, and provided to the front-end circuits 335 from, the antenna systems 310. In some instances, the front-end circuits 335 may be configured to convert received IF signals from the IF circuit 330 to RF signals (amplifying with a power amplifier as appropriate), and provide the RF signals to the antenna systems 310 for radiation. The front-end circuits 335 may also convert RF signals received by the antenna systems 310 to IF signals (e.g., using a low-noise amplifier and a mixer) and to send the IF signals to the IF circuit 330. The IF circuit 330 may be configured to convert IF signals received from the front-end circuits 335 to baseband signals and to provide the baseband signals to the processor 340. The IF circuit 330 may also be configured to convert baseband signals provided by the processor 340 to IF signals, and to provide the IF signals to the front-end circuits 335. The processor 340 is communicatively coupled to the IF circuit 330, which is communicatively coupled to the front-end circuits 335, which are communicatively coupled to the antenna systems 310, respectively.

The antenna systems 310 may be formed as part of the PCB layout 300 in a variety of manners. As described with reference to FIG. 3, dashed lines 345 separating the antenna systems 310 from the PCB 325 (or from the main portion 320) indicate functional or physical separation of the antenna systems 310 (and the components thereof) from other portions of the PCB layout 300. The antenna systems 310 may be integrated onto the PCB 325, being formed as integral components of the PCB 325 or may be separate from, but attached to (such as coupled with), the PCB 325 (e.g., the antenna systems 310 may be formed separately as or within separate PCBs but may be electrically and communicatively coupled with the main portion 320 within a common housing subsequent to fabrication, such that, for example, the main portion 320 may correspond to a first PCB within a housing, end 315-*a* or antenna 310-*b* may correspond to a second PCB within the housing, and end 315-*b* or antenna 310-*b* may correspond to a third PCB within the housing). Alternatively, one or more components of the antenna system 310-*a* and/or the antenna system 310-*b* may be formed integrally with the PCB 325, and one or more other components may be formed separate from the PCB 325 and mounted to the PCB 325, or otherwise made part of or accommodated by the PCB layout 300. Alternatively, each of the antenna systems 310 may be formed separately from the PCB 325 and mounted to the PCB 325 and coupled to the front-end circuits 335, respectively. In some examples, one or both of the front-end circuits 335 are implemented with the antenna system 310-*a* or 310-*b* in a module and coupled to the PCB 325. For example, the module may be mounted to the PCB 325 or may be spaced from the PCB 325 and coupled thereto, for example using flexible cable or a flexible circuit. The antenna systems 310 may be configured similarly to each other or differently from each other. For example, one or more components of either of the antenna systems 310, may be omitted. As an example, the antenna system 310-*a* may include 4G and 5G radiators while the antenna system 310-*b* may not include (may omit) a 5G radiator. In other examples, an entire one of the antenna systems 310 may be omitted or may be configured for use with a non-cellular technology such as a WLAN technology.

Each antenna system 310 may be associated with one or more ground planes. In some examples, the one or more ground planes may be asymmetric (e.g., rectangular and oblong, with one edge longer than another). In some examples, such as when one or both of the front-end circuits 335 are implemented with the antenna system 310-*a* or 310-*b* in a module and coupled to the PCB 325, the one or more ground planes may be separate from a ground plane associated with PCB 325, each module having its own ground plane. In other examples, such as when the antenna systems 310 are integrated onto the PCB 325, the ground plane associated with PCB 325 may also be associated with the antenna systems 310.

A display (not shown) may roughly cover the same area as the PCB 325 and serve as a system ground plane for the antenna systems 310 (and possibly other components of a mobile device such as a UE 115). The display may be disposed below the antenna system 310-*a* and above the antenna system 310-*b* (with "above" and "below" being relative to the UE 115, i.e., with a top of the UE 115 being above other components regardless of an orientation of the UE 115 relative to the Earth).

The antenna systems 310 may be configured to transmit and receive millimeter-wave energy. The antenna systems 310 may be configured to steer to different scan angels and/or to change size of beamwidth, e.g., between a Pseudo-Omni (PO) beam and a narrower beam.

Here, the antenna systems 310 are configured similarly, with multiple radiators to facilitate communication with other devices at various directions relative to the UE 115. In the example of FIG. 3, the array of patch radiator stacks may overlap a ground plane. In some cases, a first patch radiator stack in the array may include a first patch radiator having a first edge that is nonparallel with the first edge of the ground plane and with the second edge of the ground plane. For example, the first patch radiator stack may be at a forty-five (45) degree angle relative to the first edge of the ground plane and relative to the second edge of the ground plane.

In some instances, antenna system 310-*a* includes an array 350 of patch radiator systems. In other examples, one or more antenna systems may include one or more dipole radiators, or a combination of one or more dipole radiators and one or more patch radiators. In other examples, one or more other types of radiators may be used alone or in combination with one or more dipole radiators and/or one or more patch radiators. The patch radiators are configured to radiate signals primarily to, and receive signals primarily from, above and below a plane of the PCB layout 300, i.e., into and out of the page showing FIG. 3. Although not illustrated in FIG. 3, according to some examples, the array 350 of the patch radiator systems may be tilted with respect to the PCB 320 (such as a plane of the PCB layout 300). Such arrangement of the array 350 may configure the patch radiators to radiate in a direction that is not perpendicular to the PCB 320. In some examples, the array 350 of the patch radiator systems may be positioned so as to radiate out of an edge of the device (such as UE 115). The ground plane of the array may be angled relative to the ground plane of the PCB 320 (e.g, the ground plane of the rest of the device). For example, the ground plane of the array may be perpendicular to the ground plane of the PCB 320. Positioning the antenna systems 310 in or near corners of the PCB layout 300 may help provide spatial diversity (directions relative to the UE 115 to which signals may be transmitted and from which signals may be received), e.g., to help increase MIMO (Multiple Input, Multiple Output) capability. Further, the array 350 of patch radiators may be configured to provide dual-polarization radiation and reception.

Figure 4:
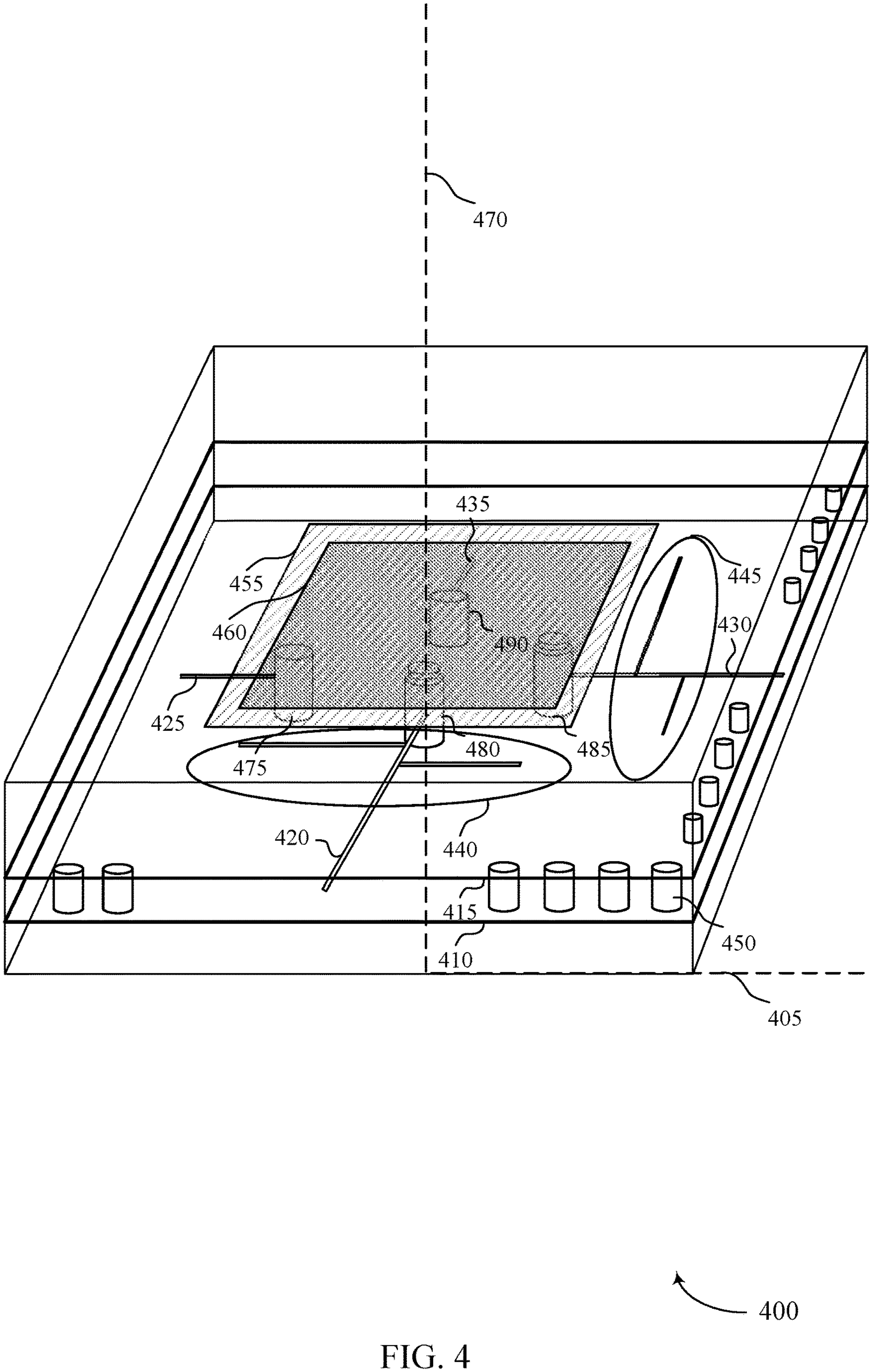
FIG. 4 illustrates an example of a patch radiator structure that supports an antenna array in accordance with aspects of the present disclosure.

FIG. 4 illustrates an example of a patch radiator structure 400 that supports methods for wireless communications in accordance with aspects of the present disclosure. In some examples, patch radiator structure 400 may be implemented in various components of wireless communications system 100, e.g., in base stations 105 and/or UEs 115.

5G networks may be designed to provide a large range of bandwidths in small cells. Devices operating in 5G networks may include phased array antennas supporting MIMO communications through beamforming. In some cases, a phased patch radiator array may support MIMO communications using dual-band and dual antenna polarizations. Further, phased patch radiator arrays may achieve diversity gain using dual orthogonal feeds. For example, dual-feed dual-polarization may include feeds covering a horizontal polarization and a vertical polarization in both a low-band frequency and a high-band frequency. In some patch radiator structures supporting dual-feed, the patch radiator may include two dual-band ports, each for one of two polarizations. More specifically, one port may be used for feeds with vertical polarization in both high-band frequencies and low-band frequencies, and the other port may be used for feeds with horizontal polarization in both high-band frequencies and low-band frequencies. In such cases, a diplexer may be included in each dual-band feed and used to split the dual-band feed.

In the example of FIG. 4, the patch radiator structure 400 includes a first ground plane 410, a second ground plane 415, a first patch radiator 455, and a second patch radiator 460. The first ground plane 410 and the second ground plane 415 may be coupled with one another by one or more of electrical connectors 450, e.g., a plurality of vias and/or micro-vias. The first ground plane 410 and the second ground plane 415 may be disposed in (e.g., formed in) parallel planes, which may both be parallel to a first axis 405 that extends in a first direction. In some examples, the first ground plane 410 may be at (e.g., formed in or otherwise disposed in) a first layer of a PCB, and the second ground plane 415 may be at (e.g., formed in or otherwise disposed in) another layer of the PCB. The PCB may be an example of aspects of a PCB 325 as described with reference to FIG. 3. As used herein, the descriptors "ground plate" and "ground plane" may be used interchangeably. In some cases, the first patch radiator 455 and the second patch radiator 460 may be disposed in (e.g., formed in) a stacked configuration. For example, the second patch radiator 460 may be vertically stacked over the first patch radiator 455, with the vertical direction corresponding to a second axis 470 that is orthogonal to the first axis 405. In some examples, the first patch radiator 455 and the second patch radiator 460 may be concentric about the second axis 470 (e.g., the second axis 470 may be a common vertical axis that passes through the center of both the first patch radiator 455 and the second patch radiator 460). In some examples, the first patch radiator 455 may be at (e.g., formed in or otherwise disposed in) a second layer of the PCB, and the second patch radiator 460 may be at (e.g., formed in or otherwise disposed in) a third layer of the PCB.

In some examples, the first patch radiator 455 may be configured to receive, via two feeds, signals associated with low-band frequencies, and the second patch radiator 460 may be configured to receive, via two other feeds, signals associated with high-frequency bands. The first patch radiator 455 may have a greater area than the second patch radiator 460. In some cases, the patch radiator structure 400 may further include a third patch radiator (not shown). In some examples, the third patch radiator may be vertically stacked above the second patch radiator 460 (e.g., also concentric about the second axis 470) and may be capacitively coupled with the first patch radiator 455 and the second patch radiator 460. In some examples, the third patch radiator may be at (e.g., formed in or otherwise disposed in) a fourth layer of the PCB.

As previously discussed, the first patch radiator 455 is associated with a low-band frequency and the second patch radiator 460 is associated with a high-band frequency. The patch radiator structure 400 further includes a first feed 435, a second feed 425, a third feed 420, and a fourth feed 430. The first feed 435 is configured to receive a first signal having a first (e.g., vertical) polarization and associated with the low-band frequency. The second feed 425 is configured to receive a second signal having a second, orthogonal (e.g., horizontal) polarization and associated with the low-band frequency. The third feed 420 is configured to receive a third signal having the first (e.g., vertical) polarization and associated with the high-band frequency. The fourth feed 430 is configured to receive a fourth signal having the second (e.g., horizontal) polarization and associated with the high-band frequency. The first feed 435 and the second feed 425 may each be physically coupled with the first patch radiator 455, at least in part, via a respective stripline, and the third feed 420 and the fourth feed 430 may each be physically coupled with the second patch radiator 460, at least in part, via a respective stripline. In some cases, a stripline may be configured to couple with a patch using a via (such as a probe) from the stripline to the patch. In the example of FIG. 4, the first feed 435 is coupled with a stripline which in turn couples with a first probe 490, and the second feed 425 is coupled with a stripline which couples with a second probe 475. Similarly, the third feed 420 is coupled with a stripline which couples with a third probe 480, and the fourth feed 430 is coupled with a stripline which couples with a fourth probe 485. As depicted herein, the probes may be configured to connect vertically to the patches. For example, the first probe 490 and the second probe 475 connects to the first patch radiator 455, and the third probe 480 and the fourth probe 485 connects to the second patch radiator 460. In some cases, a stripline may be considered as included in a respective feed. A stripline may be a transmission line that runs parallel to a plane associated with the first ground plane 410 and the second ground plane 415 and may be electrically isolated from the first ground plane 410 and the second ground plane 415 by a dielectric material (e.g., the stripline may be suspended in and supported by the dielectric material). In general, active layers of the patch radiator structure 400 may be separated (e.g., electrically isolated) from one another by one or more inactive layers, such as layers of dielectric material. Although a probe is described to couple the striplines to the patch radiators, it is understood that other types of feeds (such as slot feeds, capacitive feeds, etc.) or mechanisms for coupling a stripline to a patch radiator may be possible.

The patch radiator structure 400 may further include a first filter 440 and a second filter 445. In some examples, the first filter 440 may be associated with the third feed 420 and the second filter 445 may be associated with the fourth feed 430. In some cases, the first filter 440 may be implemented in the strip line corresponding to the third feed 420 and the second filter 445 may be implemented in the strip line corresponding to the fourth feed 430. The first filter 440 and the second filter 445 may thus be associated with (e.g., included in the signal path of) the high-band feeds and may be configured to reject signals associated with low-band frequencies. For example, the first filter 440 and the second filter 445 may be notch filters, bandpass filters, high pass filters, band stop filters, or any filter designed to reject low-band frequency signals. More specifically, the first filter 440 may be configured to filter low-band frequencies from the third signal having a vertical polarization. Further, the second filter 445 may be configured to filter low-band frequencies from the fourth signal having a horizontal polarization. As the patch radiator structure 400 may simultaneously receive feeds associated with dual-bands, the filter 440 and the second filter 445 may be used to isolate each feed.

In some cases, the isolation of the low-band feeds from high-band frequencies (e.g., due to filters 440, 445 included in the high-band feeds) may be sufficient (e.g., may satisfy a threshold level) without the inclusion of respective low-pass filters in the low-band feeds. However, a filter configured to reject signals associated with high-band frequencies may be added to a low-band feed if the isolation associated with high-band frequencies fails to satisfy the threshold. Thus, although not shown in the example of FIG. 4, in some examples, the patch radiator structure 400 may further include a third filter and a fourth filter. In some examples, the third filter may be included in the first feed 435 and the fourth filter may be included in the second feed 425. In some cases, the third filter (not shown) may be implemented in the strip line corresponding to the first feed 435 and the fourth filter (not shown) may be implemented in the strip line corresponding to the second feed 425. The third filter and the fourth filter may be configured to reject signals associated with high-band frequencies. For example, the third filter and the fourth filter may be notch filters, bandpass filters, low pass filters, band stop filters, or any filter designed to reject high-band frequency signals. In one example, the third filter may be configured to filter high-band frequencies from the first signal having a vertical polarization. Further, the fourth filter may be configured to filter high-band frequencies from the second signal having a horizontal polarization.

Figure 5:
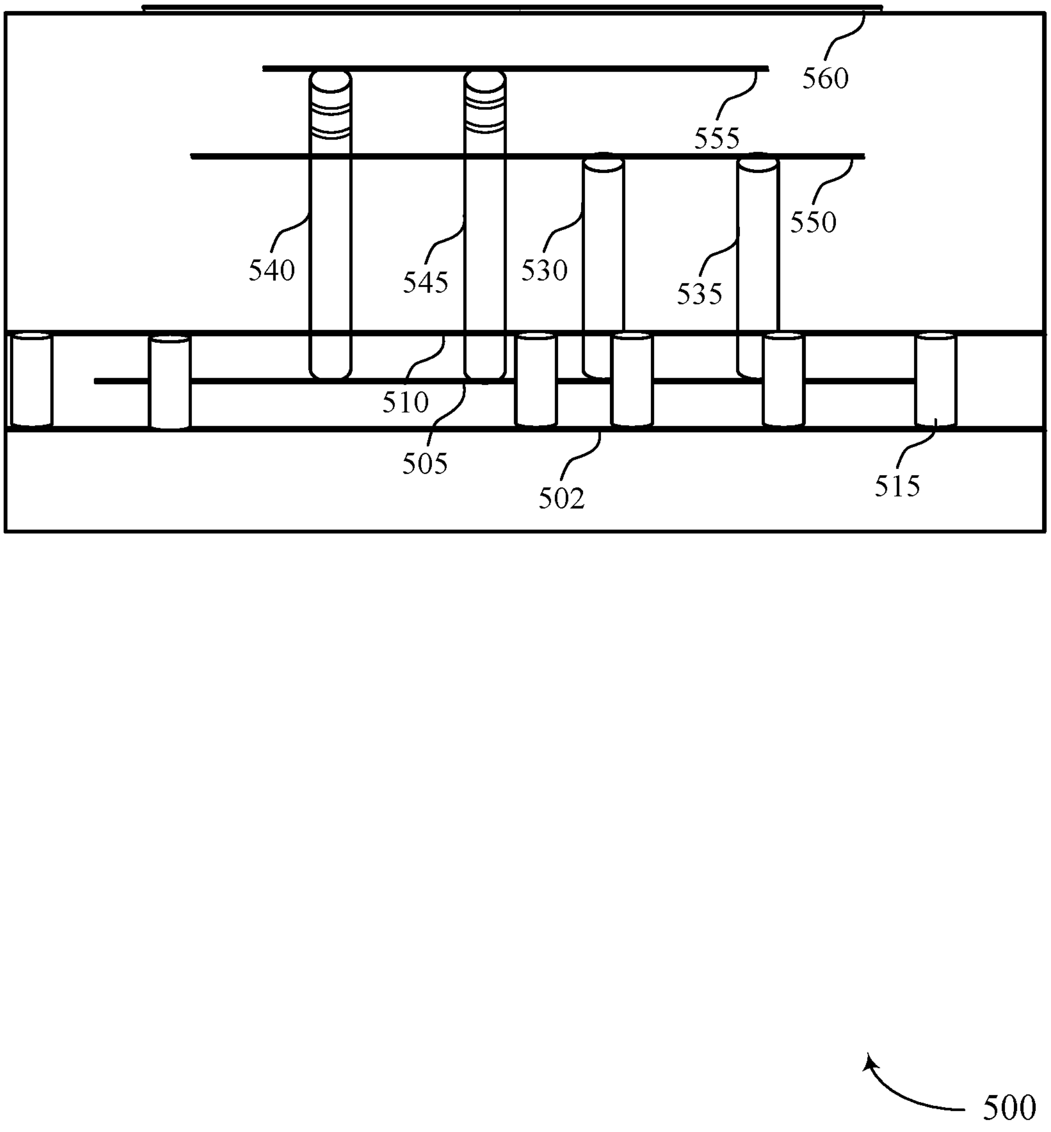
FIG. 5 illustrates an example of a cross-sectional view of a patch radiator structure that supports an antenna array in accordance with aspects of the present disclosure.

FIG. 5 illustrates an example of a cross-sectional view 500 of a patch radiator structure (e.g., a dual-band and dual-polarization patch radiator structure) that supports methods for wireless communications in accordance with aspects of the present disclosure. In some examples, the cross-sectional view 500 of the patch radiator structure may be an example of aspects of a patch radiator structure 400 as described with reference to FIG. 4.

The cross-sectional view 500 of the dual-polarization patch radiator structure illustrates a first ground plane 502, a second ground plane 510, and a strip line layer 505 between the first ground plane 502 and the second ground plane 510. The strip line layer 505 may include a number of strip lines, each associated with a respective feeds. The first ground plane 502 and the second ground plane 510 may be electrically coupled by one or more connectors 515 (such as vias). In some examples, the first ground plane 502 may be at (e.g., formed in or otherwise disposed in) a first layer of a PCB, and the second ground plane 510 may be at (e.g., formed in or otherwise disposed in) another layer of the PCB. The PCB may be an example of aspects of a PCB 325 as described with reference to FIG. 3. The patch radiator structure may include a first patch radiator 550, a second patch radiator 555 and a third patch radiator 560. In some examples, each of the first ground plane 502, the strip line layer 505, the second ground plane 510, the first patch radiator 550, the second patch radiator 555, and the third patch radiator 560 may be separated from other components of the patch radiator structure by a dielectric material (e.g., the components may be suspended in and supported by the dielectric material). In general, active layers of the patch radiator structure may be separated (e.g., electrically isolated) from one another by one or more inactive layers, such as layers of dielectric material.

As depicted in the example of FIG. 5, the first patch radiator 550, the second patch radiator 555 and the third patch radiator 560 may be disposed in (e.g., formed in) a stacked configuration. For example, the first patch radiator 550, the second patch radiator 555 and the third patch radiator 560 may be stacked in a vertical direction. In some examples, the first patch radiator 550 may be at (e.g., formed in or otherwise disposed in) a second layer of the PCB, the second patch radiator 555 may be at (e.g., formed in or otherwise disposed in) a third layer of the PCB. In some examples, the third patch radiator 560 may be at (e.g., formed in or otherwise disposed in) a fourth layer of the PCB. In some examples, the third patch radiator 560 may be a parasitic patch radiator, and may be capacitively coupled with the first patch radiator 550 and the second patch radiator 555.

The first patch radiator 550 may be configured to receive feeds associated with low-band frequencies and the second patch radiator 555 may be configured to receive feeds associated with high-frequency bands. As described in the cross-sectional view 500, the first patch radiator 550 receives and may be physically coupled with a first feed and a second feed. In the example of FIG. 5, the first feed may include a first portion 530 of the first feed, which may in some cases be a probe as described above. The first feed may further include a strip line included in the strip line layer 505 (not shown), which may couple with the first portion 530 of the first feed. The second feed may include a first portion 535 of the second feed, which may in some cases be a probe as described above. Although not shown in FIG. 5, the second feed may also include a strip line included in the strip line layer 505. The first patch radiator 550 may be physically coupled with the first feed and with the second feed (e.g., by respective probes or other mechanisms). In some examples, the first feed may be associated with a signal having a first (e.g., vertical) polarization and associated with a low-band frequency, and the second feed may be associated with a signal having a second, orthogonal (e.g., horizontal) polarization and associated with the low-band frequency.

Further, the second patch radiator 555 receives a third feed and a fourth feed. The second patch radiator 555 may be physically coupled with the third feed and with the fourth feed. The third feed may include a first portion 540 of the third feed, which may in some cases be a probe as described above. The third feed may further include a strip line included in the strip line layer 505 (not shown), which may couple with the first portion 540 of the third feed. The fourth feed may include a first portion 545 of the fourth feed, which may in some cases be a probe as described above, and a strip line included in the strip line layer 505 (not shown). The second patch radiator 555 may be physically coupled with the third feed and with the fourth feed (e.g., by respective probes or other mechanisms). The third feed may be associated with a signal having the first (e.g., vertical) polarization and associated with a high-band frequency, and the fourth feed may be associated with a signal having the second (e.g., horizontal) polarization and associated with the high-band frequency. In some cases, the first portion 540 of the third feed and the first portion 545 of the fourth feed may be configured to pass through the first patch radiator 550, for example through one or more holes in the patch radiator 550.

In some cases, the patch radiator structure may include one or more filters, such as a first filter and a second filter.

As previously discussed, the first filter may be configured to filter out low-band frequencies associated with the third feed and the second filter may be configured to filter out low-band frequencies associated with fourth feed. The first filter and the second filter may be notch filters, bandpass filters, high pass filters, band stop filters, or any filter designed to reject low-band frequency signals.

Figure 6:
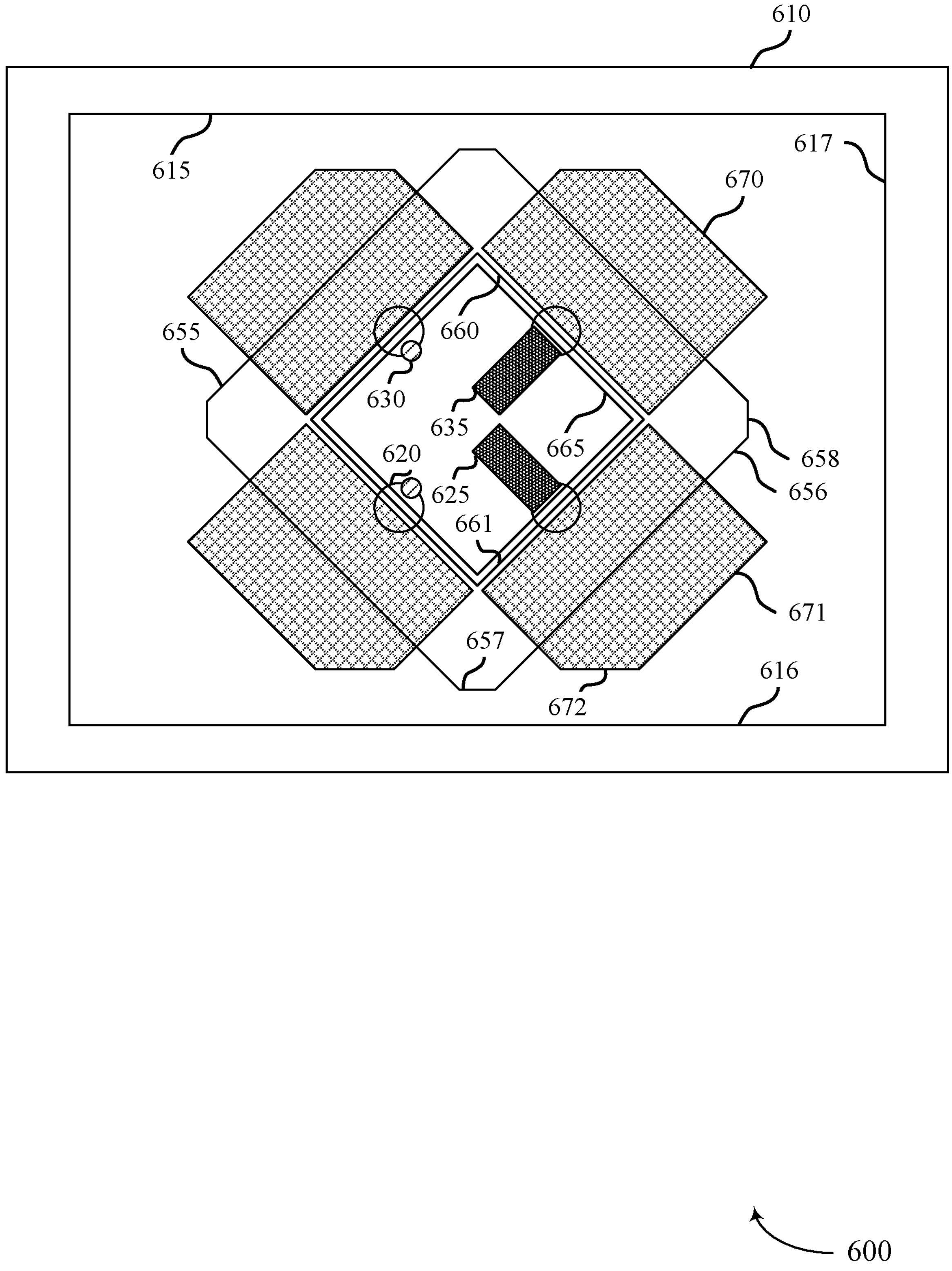
FIG. 6 illustrates an example of a patch radiator structure that supports an antenna array in accordance with aspects of the present disclosure.

FIG. 6 illustrates an example of a patch radiator structure 600 (e.g., a dual-band and dual-polarization patch radiator structure) that supports methods for wireless communications in accordance with aspects of the present disclosure. In some examples, patch radiator structure 600 may be implemented in various components of wireless communications system 100, e.g., in base stations 105 and/or UEs 115. According to one or more aspects of the present disclosure, the patch radiator structure illustrated in FIGS. 4-5 may be used according to the configuration described in FIG. 6.

5G networks may be designed to provide a large range of bandwidths in small cells. Devices operating in 5G networks may include phased array antennas supporting MIMO communications through beamforming. In some cases, a phased patch radiator array may support MIMO communications using dual-band and dual antenna polarizations. In some cases, a phased patch radiator array may include quad-fed patch elements (such as patch radiator structures) to support low band (such as 24.25-28.35 GHz) and high band (such as 37-40 GHz) frequencies using dual-polarizations. In some cases, to support multiple bands, a phased patch radiator array may include a stacked patch. Further, phased patch radiator arrays may achieve diversity gain using dual orthogonal feeds.

In the example of FIG. 6, the patch radiator structure 600 may be configured to support communications using dual-band and dual antenna polarizations. In some cases, the patch radiator structure 600 may be configured to support communication using a single band. Additionally or alternatively, the patch radiator structure 600 may be configured to support communication using more than two bands. In some cases, the patch radiator structure 600 may be rotated to achieve greater gain balance benefits. In the example of FIG. 6, the patch radiator structure 600 includes a first ground plane 610, a second ground plane 615, a first patch radiator 655, a second patch radiator 660, and a third patch radiator 665. The first ground plane 610 and the second ground plane 615 may be coupled with one another by one or more of electrical connectors, e.g., a plurality of vias and/or micro-vias. The first ground plane 610 and the second ground plane 615 may be disposed in (e.g., formed in) parallel planes, which may both be parallel to a first axis that extends in a first direction.

In some cases, the first patch radiator 655 and the second patch radiator 660 may be disposed in (e.g., formed in) a stacked configuration. For example, the second patch radiator 660 may be vertically stacked over the first patch radiator 655, with the vertical direction corresponding to a second axis that is orthogonal to the first axis 605. In some examples, the first patch radiator 655 and the second patch radiator 660 may be concentric about the second axis (e.g., the second axis may be a common vertical axis that passes through the center of both the first patch radiator 655 and the second patch radiator 660). In some cases, the second patch radiator 660 may be planar (e.g., formed in a planar layer of a PCB) and rectangular (e.g., square) and may be disposed (stacked) above the first patch radiator 655 such that the second patch radiator 660 and the first patch radiator 655 may be concentric about a common vertical axis (e.g., concentric about a z-axis orthogonal to a first x-y plane that includes the first patch radiator 655 and to a second x-y plane that includes the second patch radiator 660).

In some cases, the first patch radiator 655 may be nonparallel with the second ground plane 615. More specifically, at least first edge 656 of the first patch radiator 655 may be nonparallel with (slanted relative to, angled relative to, oriented so as to form an acute or obtuse angle with) a first edge 616 of the second ground plane 615 and with a second edge 617 of the second ground plane 615. In some cases, all edges of the first patch radiator 655 may be so rotated (nonparallel). The first edge 616 may be perpendicular to the second edge 617. In some examples, the first edge 616 may be longer than the second edge 617. In some examples, the first edge 656 of the first patch radiator 655 may be oriented at a forty-five (45) degree angle relative to the first edge 616 of the second ground plane 615 and relative to the second edge 617 of the second ground plane 615. In some examples, a third edge 658 of the first patch radiator 655 may be parallel with the second edge 617 of the second ground plane 615 (e.g., due to a corresponding corner of the first patch radiator being chopped or trimmed).

In some examples, a first edge 661 of the second patch radiator 660 may be nonparallel with the first edge 616 of the second ground plane 615 and with the second edge 617 of the second ground plane 615. The first edge 661 of the second patch radiator 660 may be parallel with the first edge 656 of the first patch radiator 655. Additionally or alternatively, each edge of the second patch radiator 660 may be nonparallel with each edge of the second ground plane 615.

In some examples, a second edge 657 of the first patch radiator 655 may be parallel with the first edge 616 of the second ground plane 615. The second edge 657 may be shorter than the first edge 656. A midpoint of the first edge 656 of the first patch radiator 655 may be separated from the first edge 616 of the second ground plane 615 by a first distance, and a midpoint of the second edge 657 may be separated from the first edge 616 by a second distance that is less than the first distance.

A set of parasitic patch radiators 670 may provide higher antenna gain by increasing a size of an antenna (or a patch radiator). The patch radiators 670 may be disposed so as to surround the third patch radiator 665. In some cases, the third patch radiator 665 may be planar (e.g., formed in a planar layer of a PCB) and rectangular (e.g., square) and may be disposed (stacked) above the first patch radiator 655 and the second patch radiator 660 such that the first patch radiator 655, the second patch radiator 660, and the third patch radiator 665 may each be concentric about a common vertical axis (e.g., concentric about a z-axis orthogonal to a first x-y plane that includes the first patch radiator 655 and to a second x-y plane that includes the second patch radiator 660 and to a third x-y plane that includes the third patch radiator 665).

One or more of the patch radiators 670 may be slanted or angled such that at least one edge is nonparallel with one or more edges 616, 617 of the second ground plane 615, and thus may in some cases instead be parallel with one or more edges of the first patch radiator 655, second patch radiator 660, or third patch radiator 665. One or more corners of each parasitic patch radiator 670 may be chopped.

In some examples, each patch radiator in the set of parasitic patch radiators 670 may have a first edge 671 that is parallel with the first edge 656 of the first patch radiator 655. Each patch radiator in the set of parasitic patch radiators 670 may have a second edge 672 that is parallel with the first edge 616 of the second ground plane 615. Additionally or alternatively, each patch radiator in the set of parasitic patch radiators 670 may have at least four (4) edges that are nonparallel with the first edge 616 of the second ground plane 615 and with the second edge 617 of the second ground plane 615.

In some examples, the first patch radiator 655 may be configured to receive, via two feeds, signals associated with low-band frequencies, and the second patch radiator 660 may be configured to receive, via two other feeds, signals associated with high-frequency bands. The first patch radiator 655 may have a greater area than the second patch radiator 660. In some cases, the patch radiator structure 600 may further include a third patch radiator 665. In some examples, the third patch radiator 665 may be vertically stacked above the second patch radiator 660 (e.g., also concentric about the second axis). In some examples, the third patch radiator 665 may be coplanar with the set of parasitic patch radiators 670. The set of parasitic patch radiator 670 may be capacitively coupled with the first patch radiator 655, the second patch radiator 660, and the third patch radiator 665.

As previously discussed, the first patch radiator 655 is associated with a low-band frequency and the second patch radiator 660 is associated with a high-band frequency. The patch radiator structure 600 further includes a first feed 635, a second feed 625, a third feed 620, and a fourth feed 630. The first feed 635 is configured to receive a first signal having a first (e.g., vertical) polarization and associated with the low-band frequency. The second feed 625 is configured to receive a second signal having a second, orthogonal (e.g., horizontal) polarization and associated with the low-band frequency. The third feed 620 is configured to receive a third signal having the first (e.g., vertical) polarization and associated with the high-band frequency. The fourth feed 630 is configured to receive a fourth signal having the second (e.g., horizontal) polarization and associated with the high-band frequency. Thus, one or both of the first patch radiator 655 and the second patch radiator 660 may be configured to receive two feeds where the two feeds received at a single patch radiator are associated with different (e.g., orthogonal) polarizations, such as vertical and horizontal polarizations respectively. Further, in some cases, the two feeds received at a single patch radiator may be aligned or substantially aligned in phase such that signals received via the two feeds may have different polarizations but a same phase.

Figure 9:
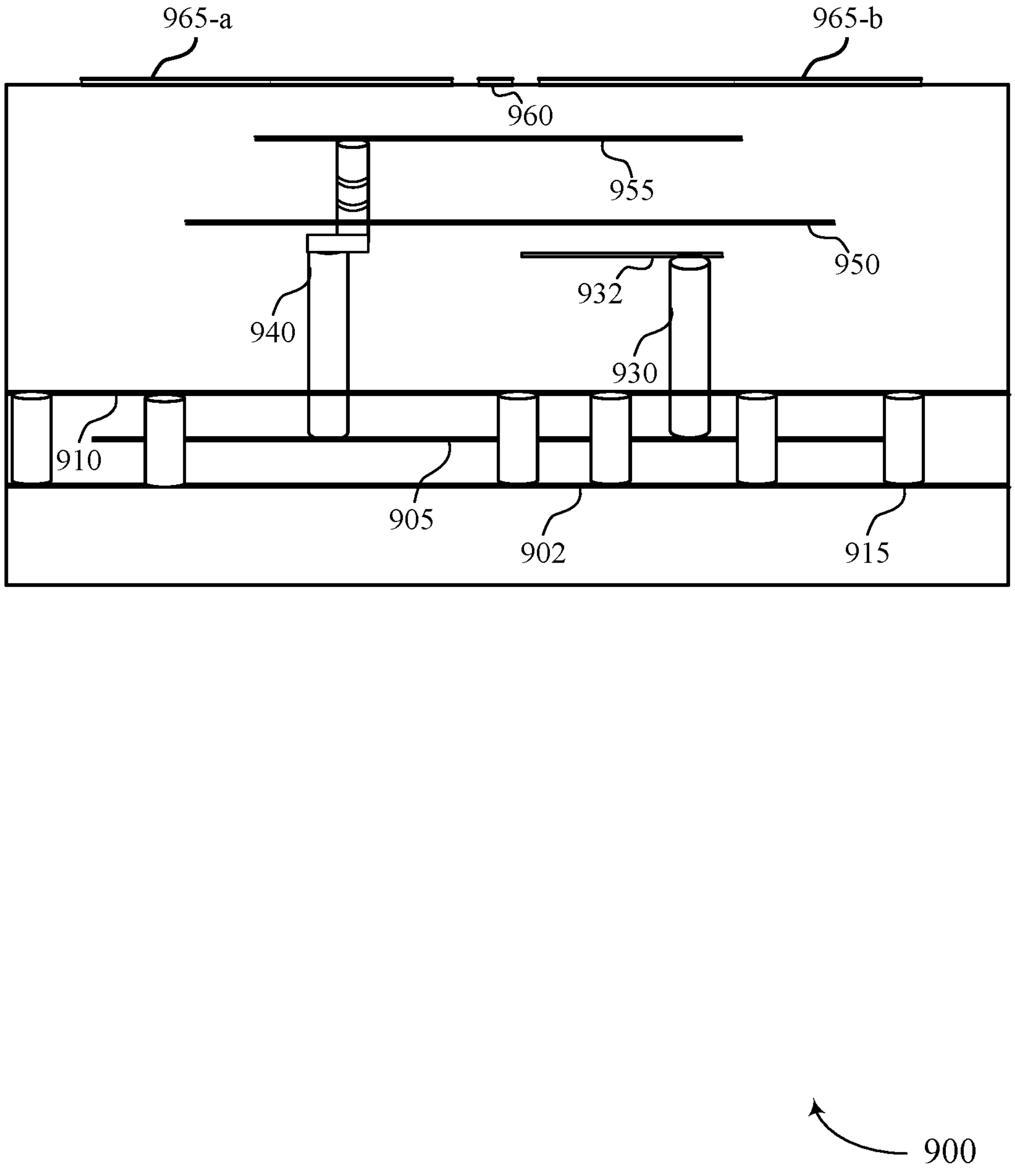
FIG. 9 illustrates an example of a cross-sectional view of a patch radiator structure that supports an antenna array in accordance with aspects of the present disclosure.

The first feed 635 and the second feed 625 may each be capacitively coupled with the first patch radiator 655, via a respective stripline, and the third feed 620 and the fourth feed 630 may each be physically (directly) coupled with the second patch radiator 660, at least in part, via a respective stripline. In some cases, a stripline may be configured to couple with a patch using a via (such as a probe) from the stripline to the patch. In the example of FIG. 6, the first feed 635 is coupled with a stripline which in turn couples with an L-probe (as shown in FIG. 9, the first feed 635 may exhibit an L shape when viewed from the side), and the second feed 625 is coupled with a stripline which couples with a second L-probe (as shown in FIG. 9, the first feed 625 may exhibit an L shape when viewed from the side). In some cases, an L-probe proximity feeding technique may be an improvement over direct feeding for thick substrate structures, as L-probe proximity feeds are configured to compensate a large inductance from the thick substrate.

Additionally, the third feed 620 is coupled with a stripline which couples with a first direct probe, and the fourth feed 630 is coupled with a stripline which couples with a second direct probe. As depicted herein, the probes may be configured to connect vertically to the patches. In some cases, a stripline may be considered as included in a respective feed. A stripline may be a transmission line that runs parallel to a plane associated with the first ground plane 610 and the second ground plane 615 and may be isolated from the first ground plane 610 and the second ground plane 615 by a dielectric material (e.g., the stripline may be suspended in and supported by the dielectric material). Though not illustrated in the example depicted in FIG. 6, it is to be understood that the third feed 620 and fourth feed 630 may in some examples use a capacitive feed, such as an L-probe proximity feed. Although a probe is described to couple the striplines to the patch radiators, it is understood that other types of feeds (such as slot feeds, capacitive feeds, etc.) or mechanisms for coupling a stripline to a patch radiator may be possible.

Figure 7:
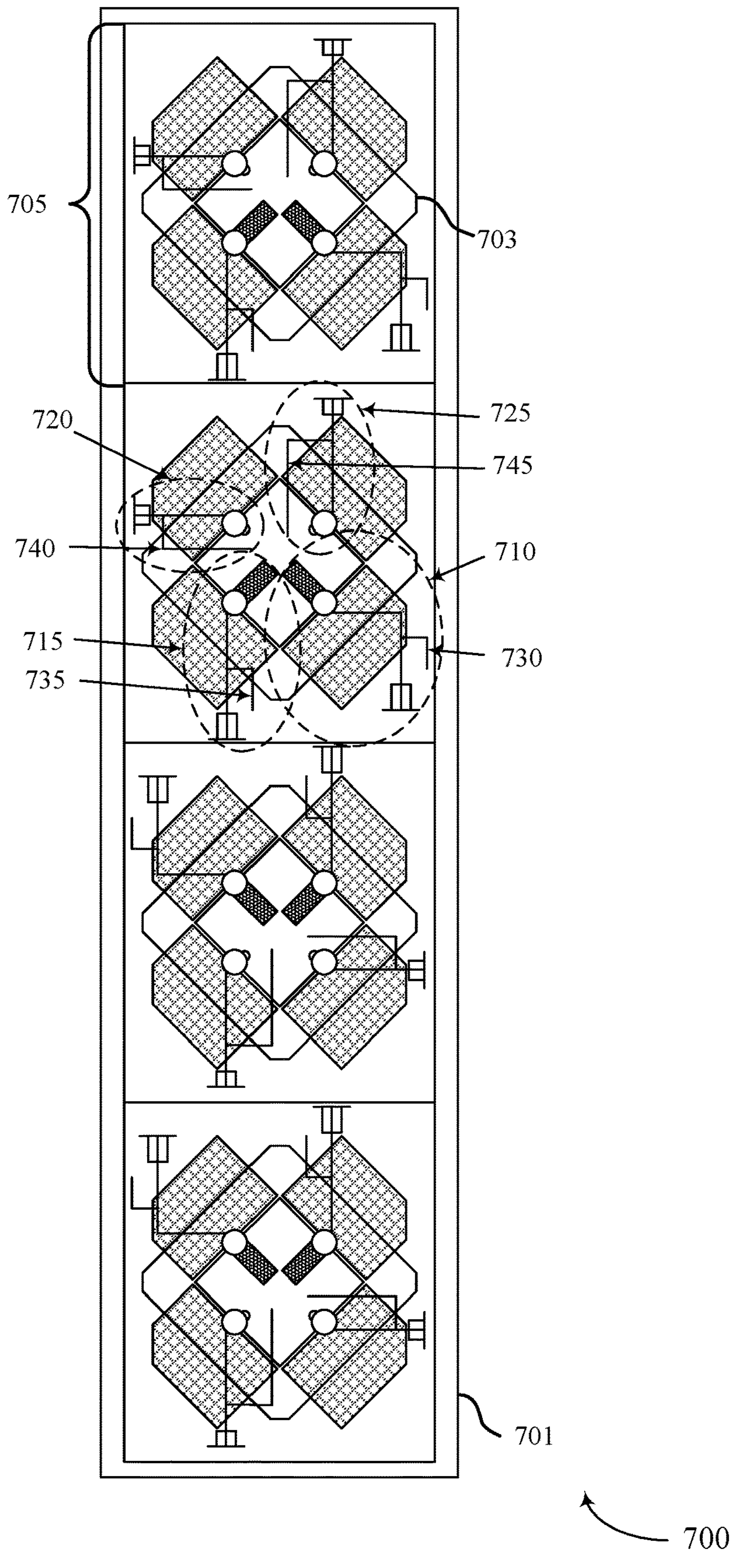
FIG. 7 illustrates an example of a module that supports an antenna array in accordance with aspects of the present disclosure.

FIG. 7 illustrates an example of a module 700 that supports methods for wireless communications in accordance with aspects of the present disclosure. The module 700 may include an array of patch radiator stacks (e.g., a dual-band and dual-polarization patch radiator structure), also known as a patch array, which may be an example of aspects of an array 350 as described with reference to FIG. 3. In the example of FIG. 7, module 700 includes an array of four (4) patch radiator stacks 705 and a ground plane 701. Patch radiator stack 705 may be an example of aspects of a patch radiator structure 600 as described with reference to FIG. 6. Ground plane 701 may be asymmetric, e.g., rectangular and oblong, with a first edge longer than a second edge. In some examples, a length of the first edge may twice a length of the second edge. In other examples, the length of the first edge may be 4 times or more the length of the second edge.

The array of patch radiator stacks in module 700 may be 22.8 mm in length and 4.2 mm in width. One or more patch radiator stacks in the array of patch radiator stacks may be rotated with respect to one or more other patch radiator stacks in the array of patch radiator stacks. For example, a first patch radiator stack in the array of patch radiator stacks may be rotated one-hundred and eighty (180) degrees relative to a second patch radiator stack in the array of patch radiator stacks. In the example of FIG. 7, the array of patch radiator stacks is disposed such that corners of patch radiators 703 are close together, while parallel edges of patch radiators 703 are offset relative to one another. In some other examples, the array of patch radiator stacks may be disposed such that parallel edges of patch radiators 703 are close together and aligned.

The patch radiator stack 705 includes a first feed 710, a second feed 715, a third feed 720, and a fourth feed 725. The first feed 710 is configured to receive a first signal having a first (e.g., vertical) polarization and associated with the low-band frequency. The second feed 715 is configured to receive a second signal having a second, orthogonal (e.g., horizontal) polarization and associated with the low-band frequency. The third feed 720 is configured to receive a third signal having the first (e.g., vertical) polarization and associated with the high-band frequency. The fourth feed 725 is configured to receive a fourth signal having the second (e.g., horizontal) polarization and associated with the high-band frequency. The first feed 710 and the second feed 715 may each be capacitively coupled with a first patch radiator, at least in part, via a respective stripline, and the third feed 720 and the fourth feed 725 may each be physically coupled with a second patch radiator, at least in part, via a respective stripline. In some cases, a stripline may be configured to couple with a patch using a via (such as a probe) from the stripline to the patch.

In the example of FIG. 7, the first feed 710 is coupled with a stripline which in turn couples with an L-probe, and the second feed 715 is coupled with a stripline which couples with a second L-probe. Similarly, the third feed 720 is coupled with a stripline which couples with a first direct probe, and the fourth feed 725 is coupled with a stripline which couples with a second direct probe. As depicted herein, the probes may be configured to connect vertically to the patches. In some cases, a stripline may be considered as included in a respective feed. A stripline may be a transmission line that runs parallel to a plane associated with a first ground plane and a second ground plane and may be isolated from the first ground plane and the second ground plane by a dielectric material (e.g., the stripline may be suspended in and supported by the dielectric material). Although a probe is described to couple the striplines to the patch radiators, it is understood that other types of feeds (such as slot feeds, capacitive feeds, etc.) or mechanisms for coupling a stripline to a patch radiator may be possible.

The patch radiator stack 705 may further include a first filter 730 and a second filter 735. In some examples, the first filter 730 may be included in the first feed 710 and the second filter 735 may be included in the second feed 715. In some cases, the first filter 730 may be implemented in the strip line corresponding to the first feed 710 and the second filter 735 may be implemented in the strip line corresponding to the second feed 715. The first filter 730 and the second filter 735 may be configured to reject signals associated with high-band frequencies. For example, the first filter 730 and the second filter 735 may be notch filters, bandpass filters, low pass filters, band stop filters, or any filter designed to reject high-band frequency signals. In one example, the first filter 730 may be configured to filter high-band frequencies from the first signal having a vertical polarization. Further, the second filter 735 may be configured to filter high-band frequencies from the second signal having a horizontal polarization.

The patch radiator stack 705 may further include a third filter 740 and a fourth filter 745. In some examples, the third filter 740 may be associated with the third feed 720 and the fourth filter 745 may be associated with the fourth feed 725. In some cases, the third filter 740 may be implemented in the strip line corresponding to the third feed 720 and the fourth filter 745 may be implemented in the strip line corresponding to the fourth feed 725. The third filter 740 and the fourth filter 745 may thus be associated with (e.g., included in the signal path of) the high-band feeds and may be configured to reject signals associated with low-band frequencies. For example, the third filter 740 and the fourth filter 745 may be notch filters, bandpass filters, high pass filters, band stop filters, or any filter designed to reject low-band frequency signals. More specifically, the third filter 740 may be configured to filter low-band frequencies from the third signal having a vertical polarization. Further, the fourth filter 745 may be configured to filter low-band frequencies from the fourth signal having a horizontal polarization. As the patch radiator stack 705 may simultaneously receive feeds associated with dual-bands, the third filter 740 and the fourth filter 745 may be used to isolate each feed.

Figure 8:
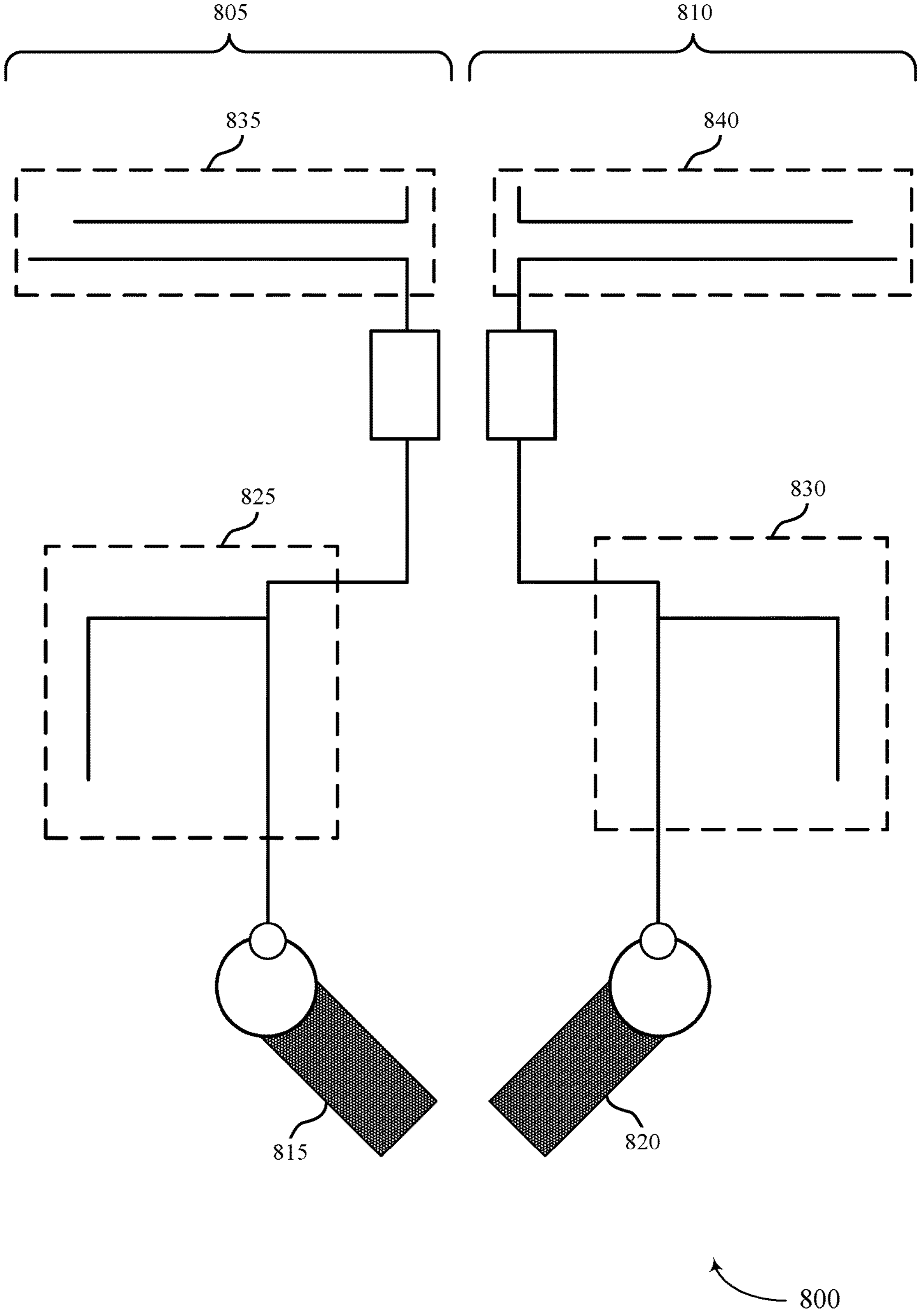
FIG. 8 illustrates an example of a filter structure in accordance with aspects of the present disclosure.

FIG. 8 illustrates an example of a filter structure 800. The filter structure 800 may be implemented in aspects of a patch radiator stack 705 as described with reference to FIG. 7. The filter structure 800 includes a first feed 805, a second feed 810, first low pass filter 825, a second low pass filter 830, a first notch filter 835, and a second notch filter 840.

As depicted in the example of FIG. 8, the first feed 805 is configured to receive a first signal having a first (e.g., vertical) polarization and associated with the low-band frequency. The second feed 810 is configured to receive a second signal having a second, orthogonal (e.g., horizontal) polarization and associated with the low-band frequency. The first feed 805 and the second feed 810 may each be capacitively coupled with a first patch radiator, at least in part, via a respective stripline. In some cases, a stripline may be configured to couple with a patch using a via (such as a probe) from the stripline to the patch. In the example of FIG. 8, the first feed 805 is coupled with a stripline which in turn couples with a first L-probe 815, and the second feed 810 is coupled with a stripline which couples with a second L-probe 820. In some cases, a stripline may be considered as included in a respective feed. A stripline may be a transmission line that runs parallel to a plane associated with a first ground plane and a second ground plane and may be isolated from the first ground plane and the second ground plane by a dielectric material (e.g., the stripline may be suspended in and supported by the dielectric material).

The filter structure 800 may further include a first low pass filter 825, a second low pass filter 830, a first notch filter 835, and a second notch filter 840. In some examples, the first low pass filter 825 and the first notch filter 835 may be included in the first feed 805 and the second low pass filter 830 and the second notch filter 840 may be included in the second feed 810. In some cases, the first low pass filter 825 and the first notch filter 835 may be implemented in the strip line corresponding to the first feed 805 and the second low pass filter 830 and the second notch filter 840 may be implemented in the strip line corresponding to the second feed 810. The first low pass filter 825, the second low pass filter 830, the first notch filter 835, and the second notch filter 840 may be configured to reject signals associated with high-band frequencies. In some cases, the first notch filter 835 and the second notch filter 840 may be configured to reject signals associated with out-of-band (OOB) frequencies (such as frequencies over 32 GHz). In one example, the first low pass filter 825 and the first notch filter 835 may be configured to filter high-band frequencies from the first signal having a vertical polarization. Further, the second low pass filter 830 and the second notch filter 840 may be configured to filter high-band frequencies from the second signal having a horizontal polarization.

FIG. 9 illustrates an example of a cross-sectional view 900 of a patch radiator structure (e.g., a dual-band and dual-polarization patch radiator structure) that supports methods for wireless communications in accordance with aspects of the present disclosure. In some examples, the cross-sectional view 900 of the patch radiator structure may be an example of aspects of a patch radiator structure 400 as described with reference to FIG. 4. In some examples, the cross-section view 900 may represent a cross-sectional view parallel to edge 616 as described with reference to FIG. 6.

The cross-sectional view 900 of the patch radiator structure illustrates a first ground plane 902, a second ground plane 910, and a strip line layer 905 between the first ground plane 902 and the second ground plane 910. The strip line layer 905 may include a number of strip lines, each associated with a respective feeds. The first ground plane 902 and the second ground plane 910 may be electrically coupled by one or more connectors 915 (such as vias). In some examples, the first ground plane 902 may be at (e.g., formed in or otherwise disposed in) a first layer of a PCB, and the second ground plane 910 may be at (e.g., formed in or otherwise disposed in) another layer of the PCB. The PCB may be an example of aspects of a PCB 325 as described with reference to FIG. 3. The patch radiator structure may include a first patch radiator 950, a second patch radiator 955 a third patch radiator 960, and a set of parasitic patch radiators 965. In some examples, each of the first ground plane 902, the strip line layer 905, the second ground plane 910, the first patch radiator 950, the second patch radiator 955, the third patch radiator 960, and the parasitic patch radiators 965 may be separated from other components of the patch radiator structure by a dielectric material (e.g., the components may be suspended in and supported by the dielectric material). In general, active layers of the patch radiator structure may be separated (e.g., electrically isolated) from one another by one or more inactive layers, such as layers of dielectric material.

As depicted in the example of FIG. 9, the first patch radiator 950, the second patch radiator 955, and the third patch radiator 960 may be disposed in (e.g., formed in) a stacked configuration. For example, the first patch radiator 950, the second patch radiator 955 and the third patch radiator 960 may be stacked in a vertical direction. In some examples, the third patch radiator 960 may be coplanar with the set of parasitic patch radiators 965. The parasitic patch radiator 965 may be capacitively coupled with the first patch radiator 950, the second patch radiator 955, and the third patch radiator 960. In some examples, the first patch radiator 950 may be at (e.g., formed in or otherwise disposed in) a second layer of the PCB, the second patch radiator 955 may be at (e.g., formed in or otherwise disposed in) a third layer of the PCB. In some examples, the third patch radiator 960 and the set of parasitic patch radiators 965 may be at (e.g., formed in or otherwise disposed in) a fourth layer of the PCB.

The first patch radiator 950 may be configured to receive feeds associated with low-band frequencies and the second patch radiator 955 may be configured to receive feeds associated with high-frequency bands. As described in the cross-sectional view 900, the first patch radiator 950 receives and may be capacitively coupled via a first L-probe 932 with a first feed and via a second L-probe with a second feed (not shown). In the example of FIG. 9, the first feed may include a first portion 930 of the first feed, which may in some cases be a probe as described above. The first feed may further include a strip line included in the strip line layer 905 (not shown), which may couple with the first portion 930 of the first feed. The second feed may include a first portion of the second feed, which may in some cases be a probe as described above. Although not shown in FIG. 9, the second feed may also include a strip line included in the strip line layer 905. The first patch radiator 950 may be capacitively coupled with the first feed by L-probe 932 and with the second feed by the second L-probe, or by other probes or mechanisms. In some examples, the first feed may be associated with a signal having a first (e.g., vertical) polarization and associated with a low-band frequency, and the second feed may be associated with a signal having a second, orthogonal (e.g., horizontal) polarization and associated with the low-band frequency. Though illustrated in the example of FIG. 9 as capacitively coupled with the first feed via L-probe 932, the first patch radiator 950 may in some cases be directly coupled with the first and second feeds (e.g., directly coupled with first portion 930).

In some cases, the patch radiator structure may include one or more filters, such as a first filter and a second filter. As previously discussed, the first filter may be configured to filter out high-band frequencies associated with the first feed and the second filter may be configured to filter out high-band frequencies associated with the second feed. The first filter and the second filter may be notch filters, bandpass filters, low pass filters, band stop filters, or any filter designed to reject high-band frequency signals.

Further, the second patch radiator 955 receives a third feed and a fourth feed (not shown). The second patch radiator 955 may be physically coupled with the third feed and with the fourth feed. The third feed may include a first portion 940 of the third feed, which may in some cases be a probe as described above. The third feed may further include a strip line included in the strip line layer 905 (not shown), which may couple with the first portion 940 of the third feed. The fourth feed may include a first portion of the fourth feed, which may in some cases be a probe as described above, and a strip line included in the strip line layer 905 (not shown). The second patch radiator 955 may be physically coupled with the third feed and with the fourth feed (e.g., by respective probes or other mechanisms). The third feed may be associated with a signal having the first (e.g., vertical) polarization and associated with a high-band frequency, and the fourth feed may be associated with a signal having the second (e.g., horizontal) polarization and associated with the high-band frequency. In some cases, the first portion 940 of the third feed and the first portion of the fourth feed may be configured to pass through the first patch radiator 950. Though illustrated in the example of FIG. 9 as directly coupled with the third feed (e.g., directly coupled with first portion 940), the second patch radiator 955 may in some cases be capacitively coupled with the third and fourth feeds (e.g., via L-probes).

In some cases, the patch radiator structure may include one or more filters, such as a third filter and a fourth filter. As previously discussed, the third filter may be configured to filter out low-band frequencies associated with the third feed and the fourth filter may be configured to filter out low-band frequencies associated with fourth feed. The third filter and the fourth filter may be notch filters, bandpass filters, high pass filters, band stop filters, or any filter designed to reject low-band frequency signal.

Figure 10:
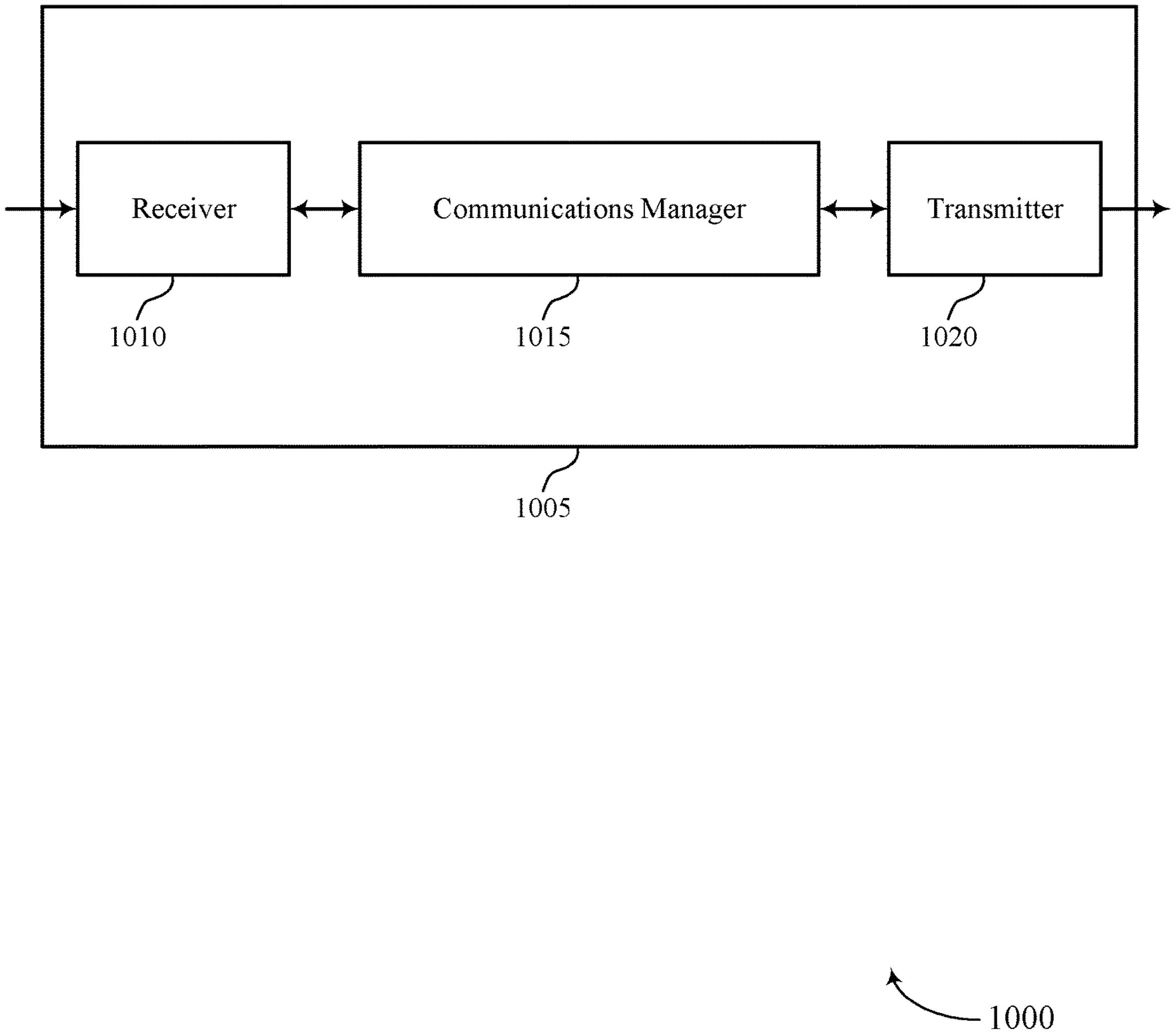
FIGS. 10, 11, and 11A show block diagrams of devices that support an antenna array in accordance with aspects of the present disclosure.

FIG. 10 shows a block diagram 1000 of a device 1005 that supports a patch radiator array in accordance with aspects of the present disclosure. The device 1005 may be an example of aspects of a UE 115 or base station 105 as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to dual-band and dual-polarization patch radiator array, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may generate a first signal having a first polarization and associated with a first frequency band, generate a second signal having a second polarization and associated with the first frequency band, generate a third signal having the first polarization and associated with a second frequency band, and generate a fourth signal having the second polarization and associated with the second frequency band. In some cases, the communications manager 1015 may transmit the generated signals to the transmitter 1020, and the transmitter 1020 may in turn transmit a signal based thereupon to another UE and/or base station. The communications manager 1015 may be an example of aspects of the communications manager 1210 or 1310 as described with reference to FIGS. 12 and 13.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1020 may include an array of patch radiators. Transmitter 1020 may receive, at a stack of patch radiators that includes at least one patch radiator with an edge that is nonparallel with at least two edges of a ground plane, via a first feed a first signal having a first polarization and associated with a first frequency band, receive, at the stack of patch radiators, via a second feed a second signal having a second polarization and associated with the first frequency band, receive, at the stack of patch radiators, via a third feed a third signal having the first polarization and associated with a second frequency band, receive, at the stack of patch radiators, via a fourth feed a fourth signal having the second polarization and associated with the second frequency band, and transmit, using the stack of patch radiators, a signal based on the first signal and the second signal, the third signal and the fourth signal, or a combination thereof.

In some examples, the transmitter 1020 may be collocated with a receiver 1010 in a transceiver module. For example, the transmitter 1020 may be an example of aspects of the transceiver 1220 or 1320 as described with reference to FIGS. 12 and 13. The transmitter 1020 may utilize a single antenna or a set of antennas.

Figure 11:
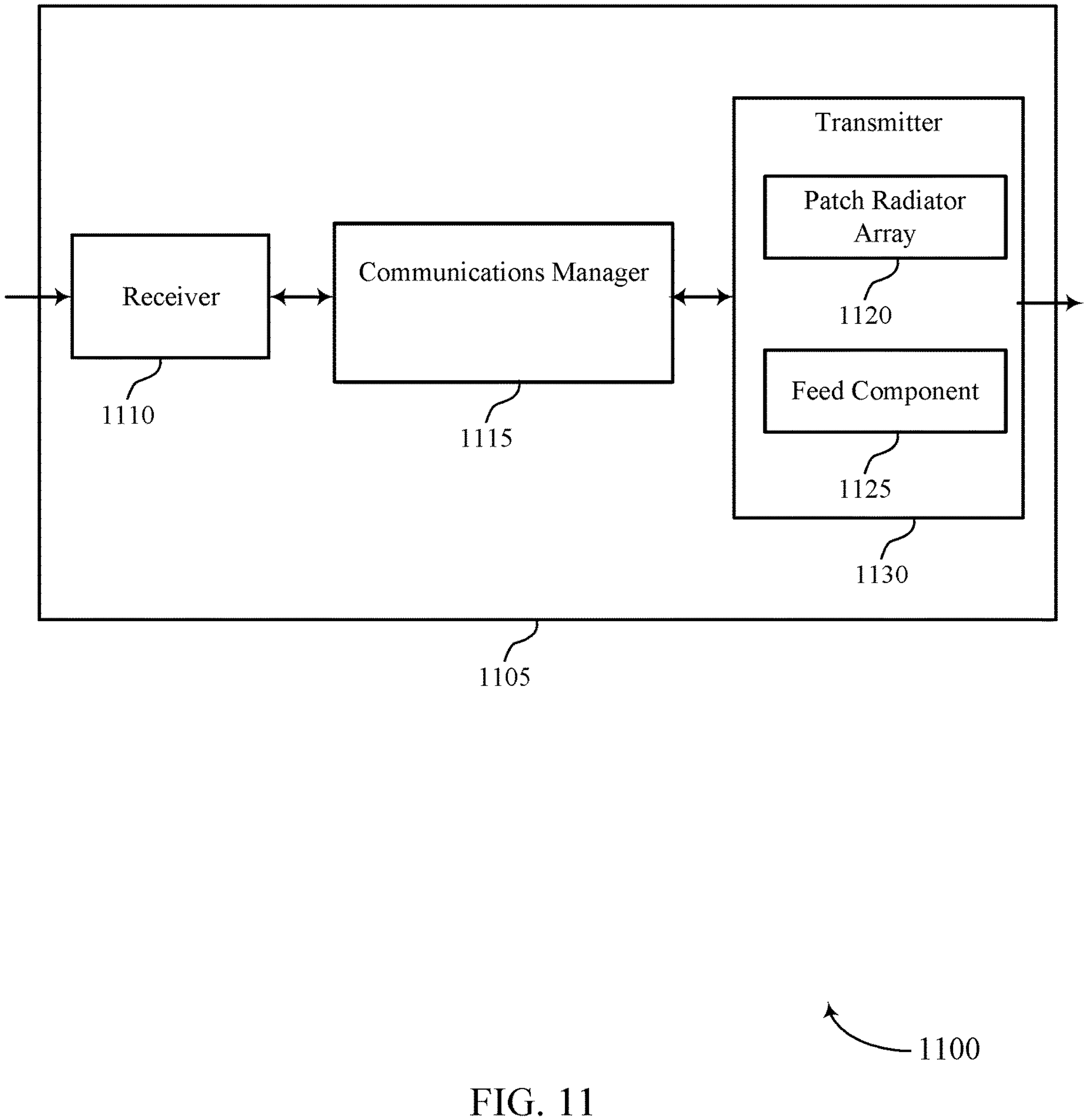

FIG. 11 shows a block diagram 1100 of a device 1105 that supports a dual-band and dual-polarization patch radiator array in accordance with aspects of the present disclosure. The device 1105 may be an example of aspects of a device 1005, a UE 115, or a base station 105 as described with reference to FIGS. 1 and 10. The device 1105 may include a receiver 1110, a communications manager 1115, and a transmitter 1130. The device 1105 may also include a processor. Each of these components may be in communication with one another (e.g., via one or more buses).

Receiver 1110 may receive information such as packets, user data, or control information associated with various information channels (e.g., control channels, data channels, and information related to dual-band and dual-polarization patch radiator arrays, etc.). Information may be passed on to other components of the device 1105. The receiver 1110 may be an example of aspects of the transceiver 1220 or 1320 as described with reference to FIGS. 12 and 13. The receiver 1110 may utilize a single antenna or a set of antennas. In some cases, the receiver 1110 may be coupled with the communications manager 1115.

The communications manager 1115 may be an example of aspects of the communications manager 1015 as described with reference to FIG. 10. The communications manager 1115 may be an example of aspects of the communications manager 1210 or 1310 as described with reference to FIGS. 12 and 13.

Transmitter 1130 may include a patch radiator array 1120 and a feed component 1125. The patch radiator array 1120 may be physically coupled to one or more antenna feeds included in feed component 1125. The transmitter 1130 may transmit signals generated by other components (such as communications manager 1115) of the device 1105. The patch radiator array 1120 may receive via a first feed included in feed component 1125 a first signal having a first polarization and associated with a first frequency band. The patch radiator array 1120 may receive via a second feed included in feed component 1125 a second signal having a second polarization and associated with the first frequency band. The patch radiator array 1120 may receive via a third feed included in feed component 1125 a third signal having the first polarization and associated with a second frequency band. The patch radiator array 1120 may receive via a fourth feed included in feed component 1125 a fourth signal having the second polarization and associated with the second frequency band.

The feed component 1125 may include one or more filters. In some examples, the feed component 1125 may filter the third signal and the fourth signal prior to the patch radiator array 1120 receiving the third signal and the fourth signal. In some examples, the feed component 1125 may pass the third signal through a first filter (e.g., a bandpass, high pass, band stop, or notch filter) configured to reject signals associated with the first frequency band. In some examples, the feed component 1125 may pass the fourth signal through a second filter (e.g., a bandpass, high pass, band stop, or notch filter) configured to reject signals associated with the first frequency band.

In some examples, the feed component 1125 may filter the first signal and the second signal prior to the patch radiator array 1120 receiving the first signal and the second signal. In some examples, the feed component 1125 may pass the first signal through a third filter (e.g., a bandpass, low pass, band stop, or notch filter) configured to reject signals associated with the second frequency band. In some examples, the feed component 1125 may pass the second signal through a fourth filter (e.g., a bandpass, low pass, band stop, or notch filter) configured to reject signals associated with the second frequency band.

The patch radiator array 1120 may then transmit a signal based on the first signal and the second signal, the third signal and the fourth signal, or a combination thereof. In some cases, the patch radiator array 1120 may transmit the signal to an external device.

The patch radiator array 1120 may be positioned on a ground plane, where a first edge of the ground plane is perpendicular to and longer than a second edge of the ground plane. The patch radiator array 1120 may include an array of patch radiator stacks overlapping the ground plane, where a first patch radiator stack in the array includes a first patch radiator having a first edge that is nonparallel with the first edge of the ground plane and with the second edge of the ground plane. In some cases, the ground plane may be at (e.g., formed in) a first layer of a PCB. and the first patch radiator may be at (e.g., formed in) a second layer of the PCB.

In some cases, at least four edges of the first patch radiator are nonparallel with the first edge of the ground plane and with the second edge of the ground plane. In some cases, the first edge of the first patch radiator is oriented at a forty-five (45) degree angle relative to the first edge of the ground plane and relative to the second edge of the ground plane.

In some cases, the patch radiator array 1120 may include a second patch radiator having a first edge that is nonparallel with the first edge of the ground plane and with the second edge of the ground plane. In some examples, the second patch radiator may be at (e.g., formed in) a third layer of the PCB. In some instances, the first edge of the second patch radiator is parallel with the first edge of the first patch radiator. In some instances, each edge of the second patch radiator is nonparallel with the first edge of the ground plane and with the second edge of the ground plane. In some cases, each edge of the second patch radiator is nonparallel with each edge of the ground plane.

In some cases, second edge of the first patch radiator is parallel with the first edge of the ground plane. In some cases, the second edge of the first patch radiator is shorter than the first edge of the first patch radiator, a midpoint of the first edge of the first patch radiator is separated from the first edge of the ground plane by a first distance, and a midpoint of the second edge of the first patch radiator is separated from the first edge of the ground plane by a second distance that is less than the first distance. In some cases, a third edge of the first patch radiator is parallel with the second edge of the ground plane.

The patch radiator array 1120 may further include a third patch radiator and a second patch radiator both overlapping with the first patch radiator, where a first edge of the third patch radiator is parallel with the first edge of the first patch radiator. In some cases, the second patch radiator may be at (e.g., formed in) a third layer of the PCB. In some cases, the third patch radiator may be at (e.g., formed in) a fourth layer of the PCB.

In some cases, patch radiator array 1120 may further include a set of parasitic patch radiators that are coplanar with the third patch radiator, the third patch radiator disposed between at least two parasitic patch radiators of the set. In some examples, the set of parasitic patch radiators may be at (e.g., formed in) the fourth layer of the PCB. In some cases, patch radiator array 1120 may further include a set of parasitic patch radiators, each patch radiator of the set having a first edge that is parallel with the first edge of the first patch radiator. In some examples, the set of parasitic patch radiators may be at (e.g., formed in) a fourth layer of the PCB. In some instances, each parasitic patch radiator of the set has a second edge that is parallel with the first edge of the ground plane. In some cases, each parasitic patch radiator of the set has at least four edges that are nonparallel with the first edge of the ground plane and with the second edge of the ground plane.

In some cases, patch radiator array 1120 may include a second patch radiator stack in the array that is rotated one-hundred and eighty (180) degrees relative to the first patch radiator stack in the array. In some instances, the first edge of the first patch radiator is nonparallel with an axis that intersects a centroid of the first patch radiator of the first patch radiator stack and a centroid of at least one patch radiator of the second patch radiator stack.

In some cases, patch radiator array 1120 may include first radiating means for radiating in a first frequency band and disposed above a rectangular ground plane, and second radiating means for radiating in a second frequency band and disposed above the first radiating means in a stacked configuration, where each of the first radiating means and the second radiating means comprises at least one edge that is angled relative to both the first edge of the rectangular ground plane and the second edge of the rectangular ground plane. In some cases, the rectangular ground plane may be disposed in (e.g., formed in) a first layer of a PCB, the first radiating means may be disposed in (e.g., formed in) a second layer of the PCB, and the second radiating means may be disposed in (e.g., formed in) a third layer of the PCB.

In some cases, patch radiator array 1120 may further include third radiating means for radiating in the second frequency band and disposed above the second radiating means in the stacked configuration, at least one edge of the third radiating means being angled relative to both the first edge of the rectangular ground plane and the second edge of the rectangular ground plane, and a plurality of parasitic radiating means for radiating in the first frequency band and coplanar with the third radiating means, at least one edge of the each parasitic radiating means in the plurality being angled relative to both the first edge of the rectangular ground plane and the second edge of the rectangular ground plane. In some examples, the third radiating means and the plurality of parasitic radiating means may be disposed in (e.g., formed in) a fourth layer of the PCB.

In some cases, patch radiator array 1120 may include a set of patch radiators comprising a first patch radiator associated with a first frequency band and a second patch radiator associated with a second frequency band that is higher than the first frequency band, where the first patch radiator and the second patch radiator are disposed in a stacked configuration, a first feed for the set of patch radiators, the first feed configured to receive a first signal having a first polarization and associated with the first frequency band, a second feed for the set of patch radiators, the second feed configured to receive a second signal having a second polarization and associated with the first frequency band, a third feed for the set of patch radiators, the third feed configured to receive a third signal having the first polarization and associated with the second frequency band, and a fourth feed for the set of patch radiators, the fourth feed configured to receive a fourth signal having the second polarization and associated with the second frequency band.

In some cases, patch radiator array 1120 may further include a third patch radiator in the set of patch radiators, the third patch radiator disposed in the stacked configuration and capacitively coupled with at least the second patch radiator.

In some cases, the first patch radiator and the second patch radiator may be concentric about a common axis that is orthogonal to a planar surface of the first patch radiator. In some cases, the first polarization may be orthogonal to the second polarization.

In some cases, patch radiator array 1120 may further include a ground plane, where the first patch radiator comprise an edge that is oriented at a forty-five (45) degree angle relative to at least one edge of the ground plane.

In some cases, the feed component 1125 may include a first feed configured to receive a first signal having a first polarization and associated with a first frequency band, a second feed configured to receive a second signal having a second polarization and associated with the first frequency band, a third feed configured to receive a third signal having the first polarization and associated with a second frequency band, and a fourth feed configured to receive a fourth signal having the second polarization and associated with the second frequency band.

Figure 11A:
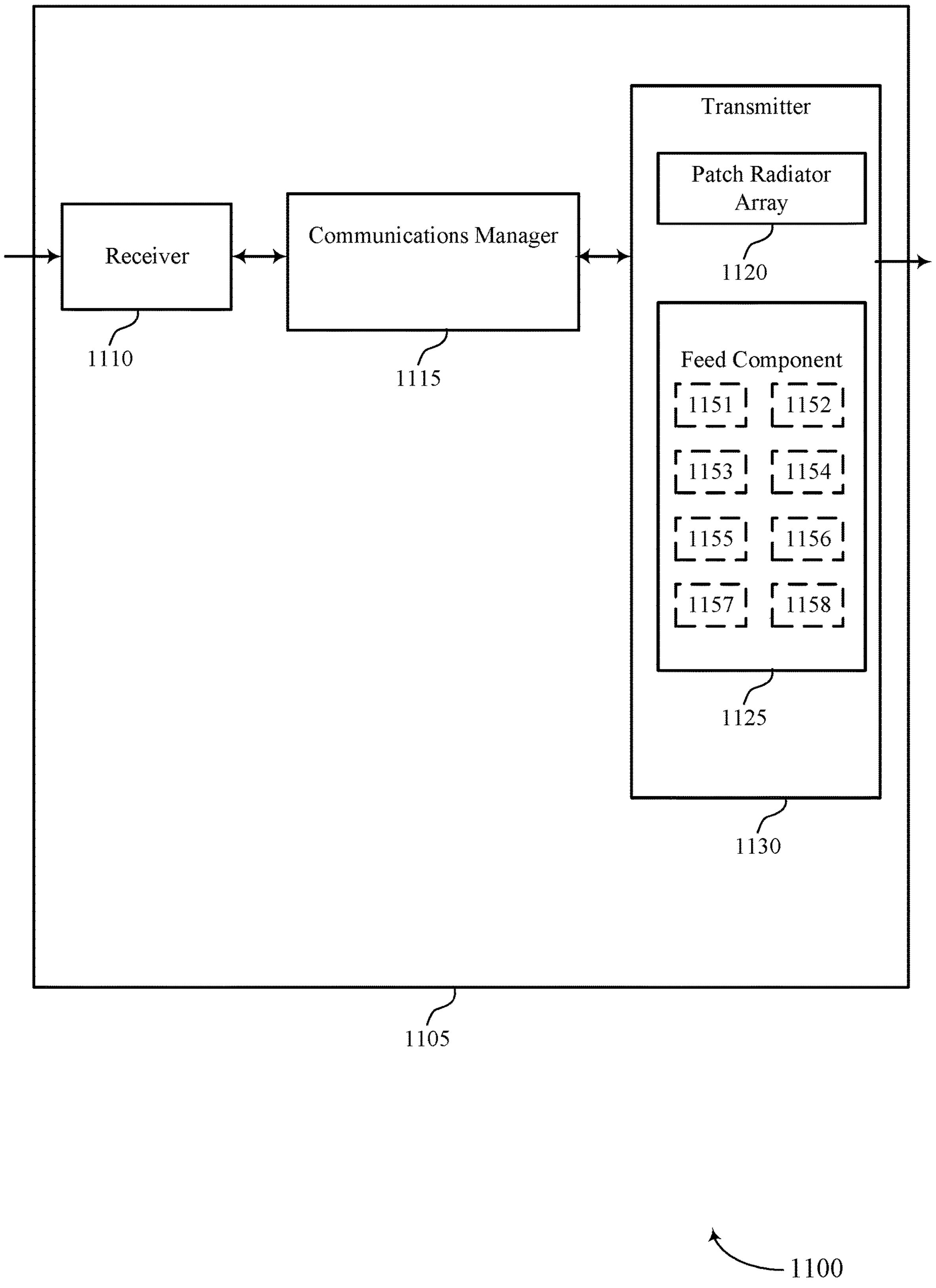

In some cases, the feed component 1125 may further include a first low pass filter (e.g., 1151 in FIG. 11A) included in the first feed and configured to reject signals associated with the second frequency band, a second low pass filter (e.g., 1152 in FIG. 11A) included in the second feed and configured to reject signals associated with the second frequency band, a first high pass filter (e.g., 1153 in FIG. 11A) included in the third feed and configured to reject signals associated with the first frequency band, and a second high pass filter (e.g., 1154 in FIG. 11A) included in the fourth feed and configured to reject signals associated with the first frequency band.

In some cases, the feed component 1125 may further include a first notch filter (e.g., 1155 in FIG. 11A) included in the first feed and configured to extract signals associated with the first frequency band, a second notch filter (e.g., 1156 in FIG. 11A) included in the second feed and configured to extract signals associated with the first frequency band, a third notch filter (e.g., 1157 in FIG. 11A) included in the third feed and configured to extract signals associated with the second frequency band, and a fourth notch filter (e.g., 1158 in FIG. 11A) included in the fourth feed and configured to extract signals associated with the second frequency band.

In some cases, the first feed and the second feed may be capacitively coupled with the first patch radiator. In some cases, the third feed and the fourth feed may be capacitively coupled with the second patch radiator.

In some examples, the transmitter 1130 may be collocated with a receiver 1110 in a transceiver module. For example, the transmitter 1130 may be an example of aspects of the transceiver 1220 or 1320 as described with reference to FIGS. 12 and 13. The transmitter 1130 may utilize a single antenna or a set of antennas.

Figure 12:
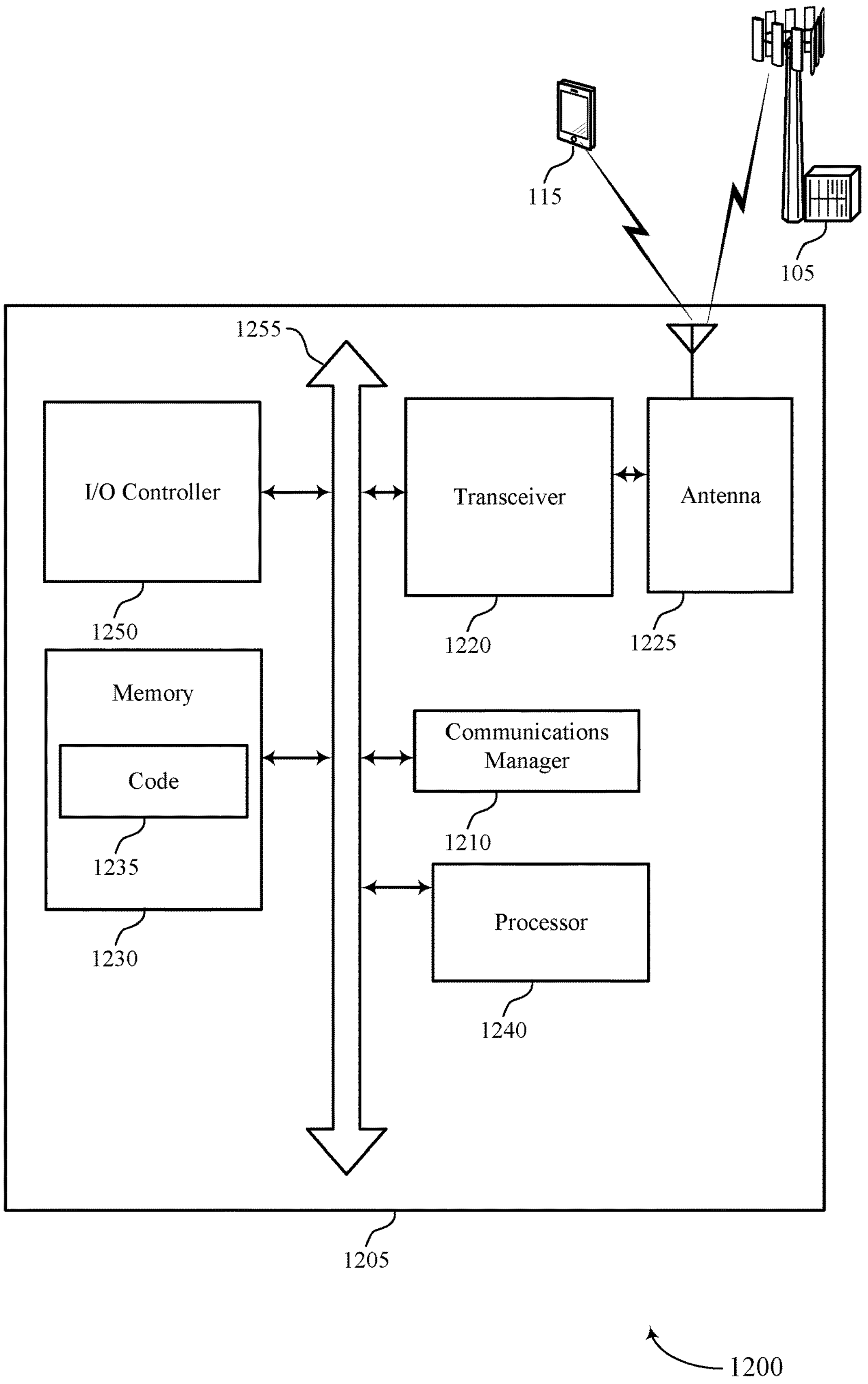
FIG. 12 shows a diagram of a system including a user equipment (UE) that supports an antenna array in accordance with aspects of the present disclosure.

FIG. 12 shows a diagram of a system 1200 including a device 1205 that supports a dual-band and dual-polarization patch radiator array in accordance with aspects of the present disclosure. The device 1205 may be an example of or include the components of device 1005, device 1105, or a UE 115 as described above, e.g., with reference to FIGS. 1, 10, and 11. The device 1205 may include components for bi-directional voice and data communications including components for transmitting and receiving communications, including a communications manager 1210, a transceiver 1220, an antenna 1225, memory 1230, a processor 1240, and an I/O controller 1250. These components may be in electronic communication via one or more buses (e.g., bus 1255).

The communications manager 1210 may be communicatively coupled with the antenna 1225 and the transceiver 1220. Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions. In some cases, the antenna 1225 may include a set of stacked patch radiators. In some cases, the antenna 1225 may include a plurality of coplanar patch radiators.

The communications manager 1210 may generate a first signal having a first polarization and associated with a first frequency band, and generate a second signal having a second polarization and associated with the first frequency band. In some examples, the communications manager 1210 may generate a third signal having the first polarization and associated with a second frequency band, and generate a fourth signal having the second polarization and associated with the second frequency band.

The antenna 1225 may receive, at a set of patch radiators, a first signal having a first polarization and associated with a first frequency band, and receive, at the set of patch radiators, a second signal having a second polarization and associated with the first frequency band. In some examples, the antenna 1225 may receive, at the set of patch radiators, a third signal having the first polarization and associated with a second frequency band, and receive, at the set of patch radiators, a fourth signal having the second polarization and associated with the second frequency band. The antenna 1225 may transmit, using the set of patch radiators, a signal based on the first signal and the second signal, the third signal and the fourth signal, or a combination thereof.

The antenna 1225 may receive, at a stack of patch radiators that includes at least one patch radiator having an edge that is nonparallel with at least two edges of a ground plane, a first signal having a first polarization and associated with a first frequency band via a first feed, receive, at the stack of patch radiators, a second signal having a second polarization and associated with the first frequency band via a second feed, receive, at the stack of patch radiators, a third signal having the first polarization and associated with a second frequency band via a third feed, receive, at the stack of patch radiators, a fourth signal having the second polarization and associated with the second frequency band via a fourth feed, and transmit, using the stack of patch radiators, a signal based at least in part on the first signal and the second signal, the third signal and the fourth signal, or a combination thereof.

The antenna 1225 may pass the first signal through a first low pass filter and a first bandpass filter both configured to reject signals associated with the second frequency band, and pass the second signal through a second low pass filter and a second bandpass filter both configured to reject signals associated with the second frequency band, pass the third signal through a first high pass filter and a third bandpass filter both configured to reject signals associated with the first frequency band, and pass the fourth signal through a second high pass filter and a fourth bandpass filter both configured to reject signals associated with the first frequency band.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dual-band and dual-polarization patch radiator array).

The I/O controller 1250 may manage input and output signals for the device 1205. The I/O controller 1250 may also manage peripherals not integrated into the device 1205. In some cases, the I/O controller 1250 may represent a physical connection or port to an external peripheral. In some cases, the I/O controller 1250 may utilize an operating system such as iOS®, ANDROID®, MS-DOS®, MS-WINDOWS®, OS/2®, UNIX®, LINUX®, or another known operating system. In other cases, the I/O controller 1250 may represent or interact with a modem, a keyboard, a mouse, a touchscreen, or a similar device. In some cases, the I/O controller 1250 may be implemented as part of a processor. In some cases, a user may interact with the device 1205 via the I/O controller 1250 or via hardware components controlled by the I/O controller 1250.

The code 1235 may include instructions to implement aspects of the present disclosure, including instructions to support wireless communication. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
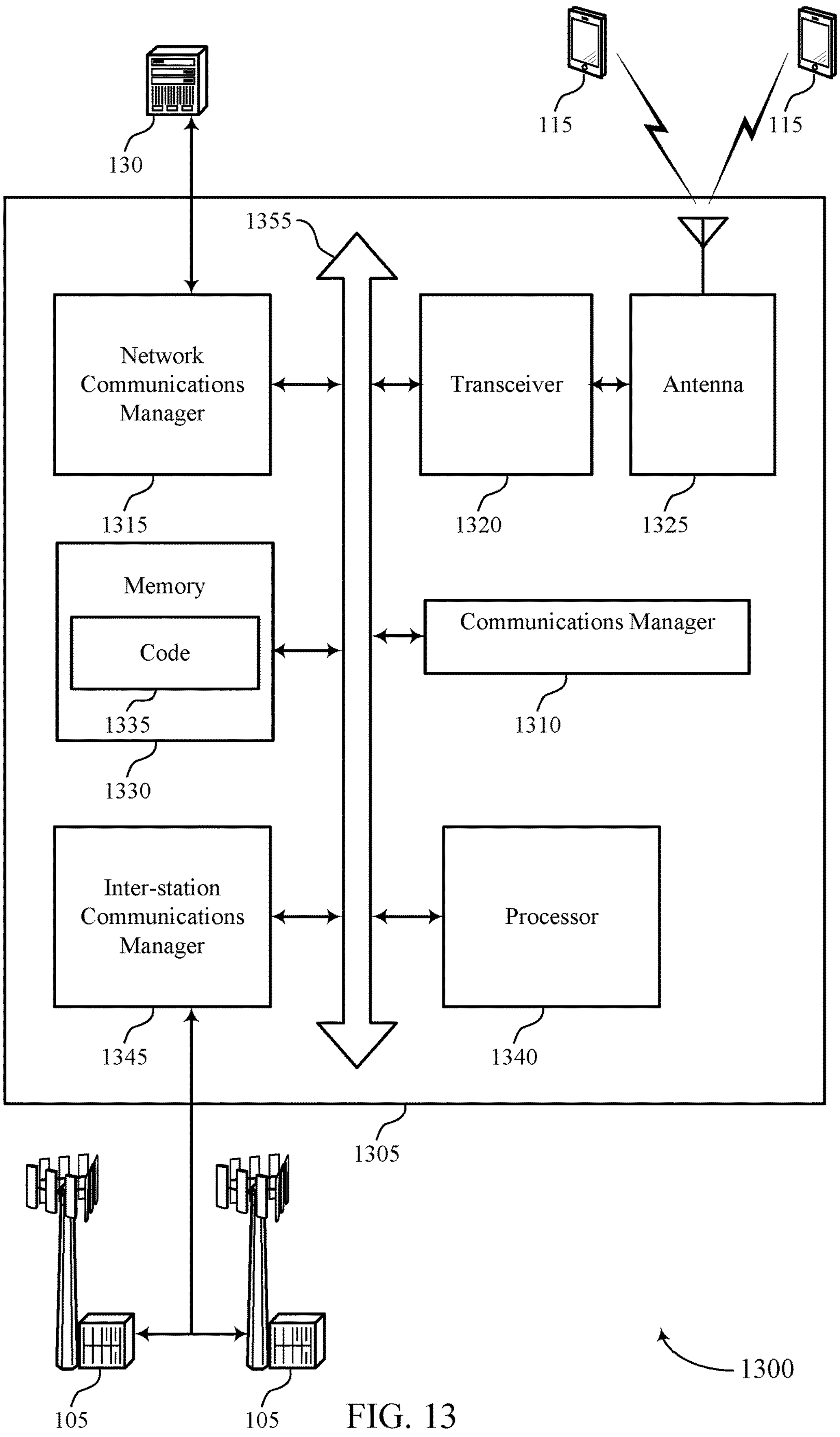
FIG. 13 shows a diagram of a system including a base station that supports an antenna array in accordance with aspects of the present disclosure.

FIG. 13 shows a diagram of a system 1300 including a device 1305 that supports dual-band and dual-polarization patch radiator array in accordance with aspects of the present disclosure. The device 1305 may be an example of or include the components of device 1005, device 1105, or a base station 105 as described above, e.g., with reference to FIGS. 1, 10, and 11. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1355).

The communications manager 1310 may be communicatively coupled with the transceiver 1320 and the antenna 1325. Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions. In some cases, the antenna 1325 may include a set of stacked patch radiators. In some cases, the antenna 1325 may include a plurality of coplanar patch radiators.

The antenna 1325 may be included on a ground plane, where a first edge of the ground plane is perpendicular to and longer than a second edge of the ground plane. The antenna 1325 may include an array of patch radiator stacks overlapping the ground plane, where a first patch radiator stack in the array includes a first patch radiator having a first edge that is nonparallel with the first edge of the ground plane and with the second edge of the ground plane. In some cases, the ground plane may be at (e.g., formed in) a first layer of a PCB. and the first patch radiator may be at (e.g., formed in) a second layer of the PCB.

In some cases, at least four edges of the first patch radiator are nonparallel with the first edge of the ground plane and with the second edge of the ground plane. In some cases, the first edge of the first patch radiator is oriented at a forty-five (45) degree angle relative to the first edge of the ground plane and relative to the second edge of the ground plane.

In some cases, the antenna 1325 may include a second patch radiator having a first edge that is nonparallel with the first edge of the ground plane and with the second edge of the ground plane. In some examples, the second patch radiator may be at (e.g., formed in) a third layer of the PCB. In some instances, the first edge of the second patch radiator is parallel with the first edge of the first patch radiator. In some instances, each edge of the second patch radiator is nonparallel with the first edge of the ground plane and with the second edge of the ground plane. In some cases, each edge of the second patch radiator is nonparallel with each edge of the ground plane.

In some cases, second edge of the first patch radiator is parallel with the first edge of the ground plane. In some cases, the second edge of the first patch radiator is shorter than the first edge of the first patch radiator, a midpoint of the first edge of the first patch radiator is separated from the first edge of the ground plane by a first distance, and a midpoint of the second edge of the first patch radiator is separated from the first edge of the ground plane by a second distance that is less than the first distance. In some cases, a third edge of the first patch radiator is parallel with the second edge of the ground plane.

The antenna 1325 may further include a third patch radiator and a second patch radiator both overlapping with the first patch radiator, where a first edge of the third patch radiator is parallel with the first edge of the first patch radiator. In some cases, the second patch radiator may be at (e.g., formed in) a third layer of the PCB. In some cases, the third patch radiator may be at (e.g., formed in) a fourth layer of the PCB.

In some cases, antenna 1325 may further include a set of parasitic patch radiators that are coplanar with the third patch radiator, the third patch radiator disposed between at least two parasitic patch radiators of the set. In some examples, the set of parasitic patch radiators may be at (e.g., formed in) the fourth layer of the PCB. In some cases, antenna 1325 may further include a set of parasitic patch radiators, each patch radiator of the set having a first edge that is parallel with the first edge of the first patch radiator. In some examples, the set of parasitic patch radiators may be at (e.g., formed in) a fourth layer of the PCB. In some instances, each parasitic patch radiator of the set has a second edge that is parallel with the first edge of the ground plane. In some cases, each parasitic patch radiator of the set has at least four edges that are nonparallel with the first edge of the ground plane and with the second edge of the ground plane.

In some cases, antenna 1325 may include a second patch radiator stack in the array that is rotated one-hundred and eighty (180) degrees relative to the first patch radiator stack in the array. In some instances, the first edge of the first patch radiator is nonparallel with an axis that intersects a centroid of the first patch radiator of the first patch radiator stack and a centroid of at least one patch radiator of the second patch radiator stack The communications manager 1310 may generate a first signal having a first polarization and associated with a first frequency band. The communications manager 1310 may generate a second signal having a second polarization and associated with the first frequency band. The communications manager 1310 may generate a third signal having the first polarization and associated with a second frequency band. The communications manager 1310 may generate a fourth signal having the second polarization and associated with the second frequency band.

The antenna 1325 may receive, at a set of patch radiators, a first signal having a first polarization and associated with a first frequency band. The antenna 1325 may receive, at the set of patch radiators, a second signal having a second polarization and associated with the first frequency band. The antenna 1325 may receive, at the set of patch radiators, a third signal having the first polarization and associated with a second frequency band. The antenna 1325 may receive, at the set of patch radiators, a fourth signal having the second polarization and associated with the second frequency band. The antenna 1325 may transmit, using the set of patch radiators, a signal based on the first signal and the second signal, the third signal and the fourth signal, or a combination thereof.

Network communications manager 1315 may manage communications with the core network (e.g., via one or more wired backhaul links). For example, the network communications manager 1315 may manage the transfer of data communications for client devices, such as one or more UEs 115.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting dual-band and dual-polarization patch radiator array).

Inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communication network technology to provide communication between base stations 105.

The code 1335 may include instructions to implement aspects of the present disclosure, including instructions to support wireless communication. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
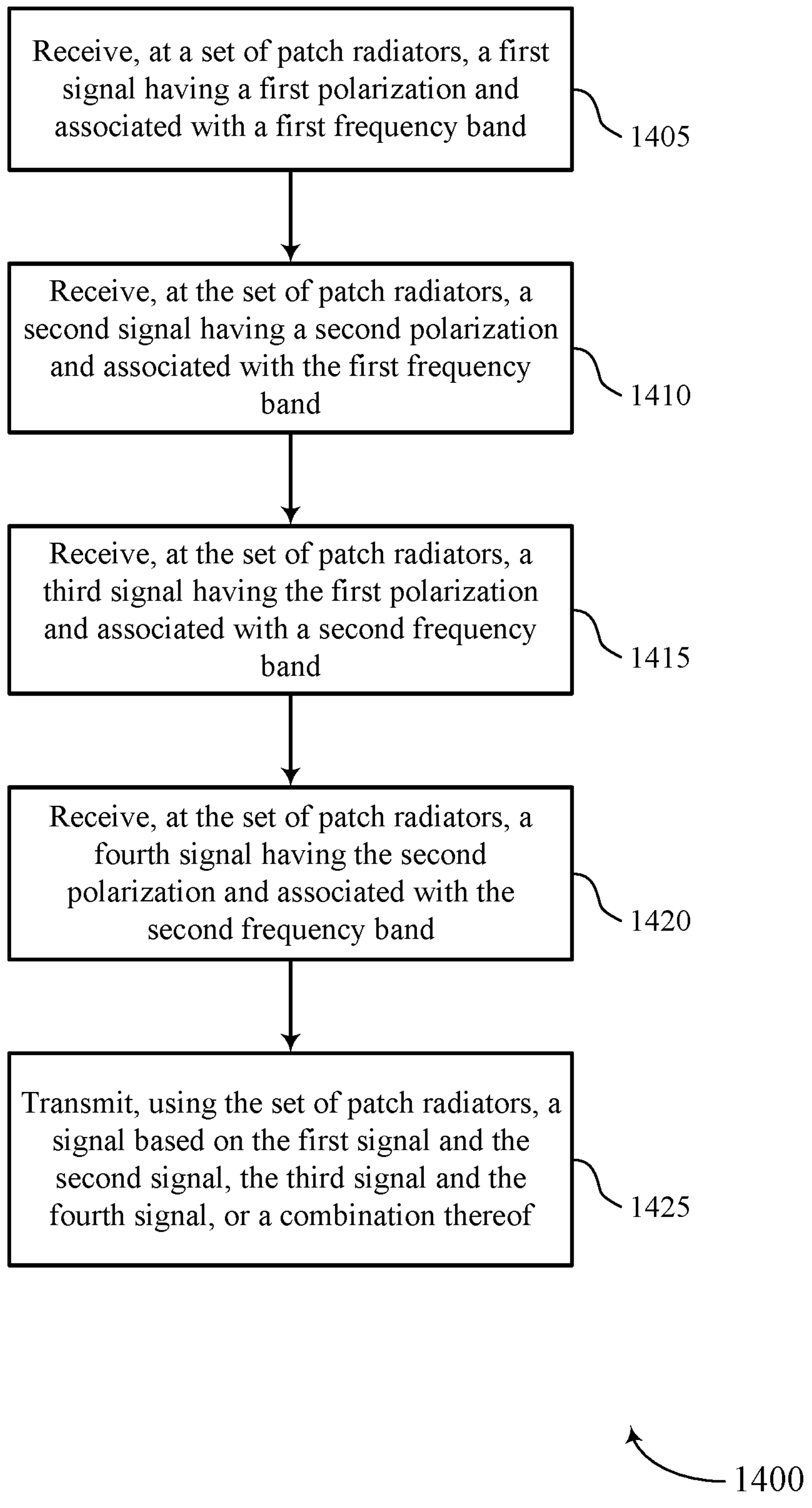
FIGS. 14 through 17 show flowcharts illustrating methods that may be supported by an antenna array in accordance with aspects of the present disclosure.

FIG. 14 shows a flowchart illustrating a method 1400 that supports dual-band and dual-polarization patch radiator array in accordance with aspects of the present disclosure. The operations of method 1400 may be implemented by a UE 115 or base station 105 or its components as described herein. For example, the operations of method 1400 may be performed by a communications manager and a transmitter as described with reference to FIGS. 10 to 13. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may receive, at a set of patch radiators, a first signal having a first polarization and associated with a first frequency band. The operations of 1405 may be performed according to the methods described herein. In some examples, aspects of the operations of 1405 may be performed by a transmitter as described with reference to FIGS. 10 to 13.

At 1410, the UE or base station may receive, at the set of patch radiators, a second signal having a second polarization and associated with the first frequency band. The operations of 1410 may be performed according to the methods described herein. In some examples, aspects of the operations of 1410 may be performed by a transmitter as described with reference to FIGS. 10 to 13.

At 1415, the UE or base station may receive, at the set of patch radiators, a third signal having the first polarization and associated with a second frequency band. The operations of 1415 may be performed according to the methods described herein. In some examples, aspects of the operations of 1415 may be performed by a transmitter as described with reference to FIGS. 10 to 13.

At 1420, the UE or base station may receive, at the set of patch radiators, a fourth signal having the second polarization and associated with the second frequency band. The operations of 1420 may be performed according to the methods described herein. In some examples, aspects of the operations of 1420 may be performed by a transmitter as described with reference to FIGS. 10 to 13.

At 1425, the UE or base station may transmit, using the set of patch radiators, a signal based on the first signal and the second signal (e.g., a low-band signal), the third signal and the fourth signal (e.g., a high-band signal), or a combination thereof (e.g., a dual-band signal). The operations of 1425 may be performed according to the methods described herein. In some examples, aspects of the operations of 1425 may be performed by a transmitter as described with reference to FIGS. 10 to 13.

Figure 15:
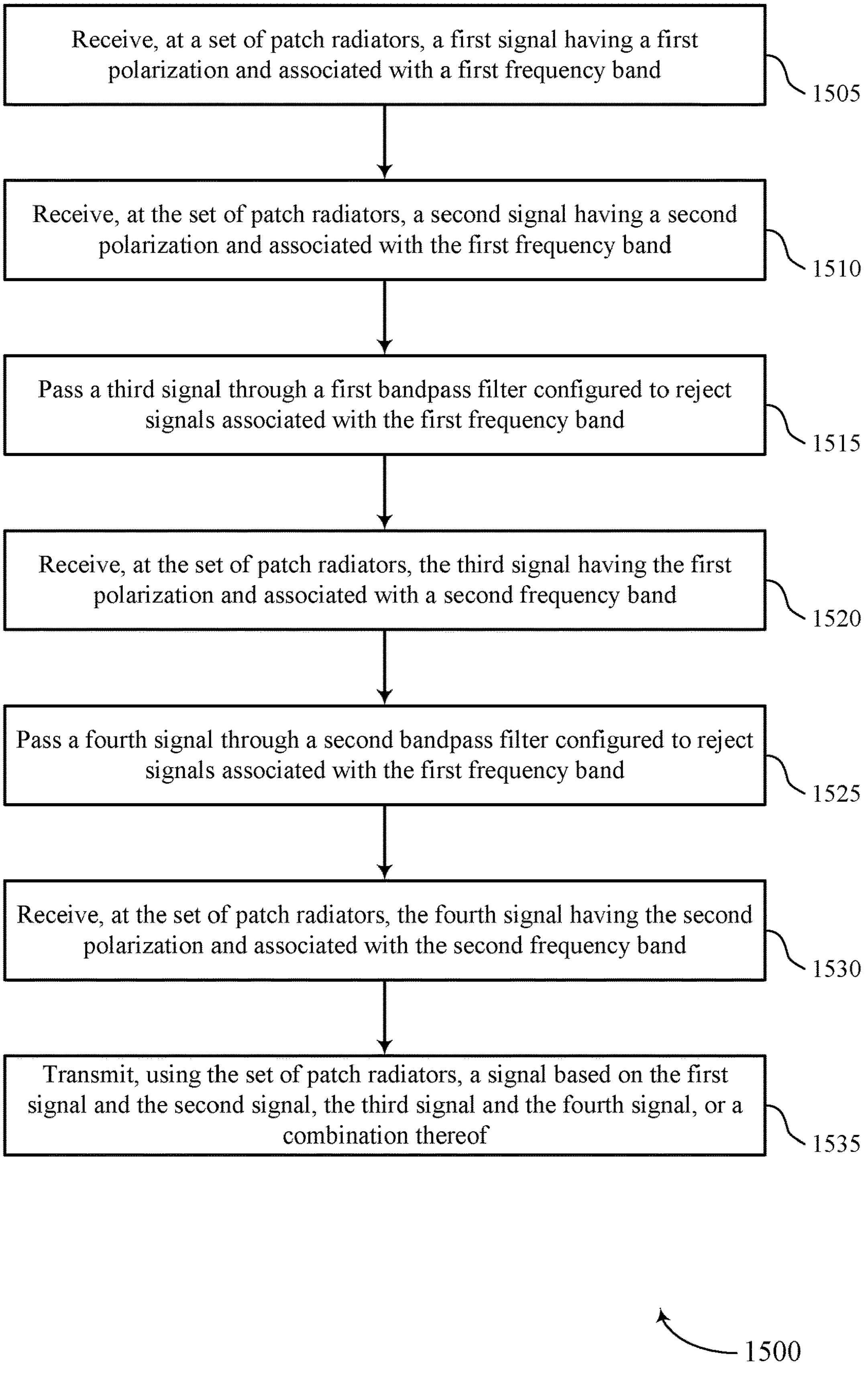

FIG. 15 shows a flowchart illustrating a method 1500 that supports dual-band and dual-polarization patch radiator array in accordance with aspects of the present disclosure. The operations of method 1500 may be implemented by a UE 115 or base station 105 or its components as described herein. For example, the operations of method 1500 may be performed by a communications manager and a transmitter as described with reference to FIGS. 10 to 13. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may receive, at a set of patch radiators, a first signal having a first polarization and associated with a first frequency band. The operations of 1505 may be performed according to the methods described herein. In some examples, aspects of the operations of 1505 may be performed by a transmitter as described with reference to FIGS. 10 to 13.

At 1510, the UE or base station may receive, at the set of patch radiators, a second signal having a second polarization and associated with the first frequency band. The operations of 1510 may be performed according to the methods described herein. In some examples, aspects of the operations of 1510 may be performed by a transmitter as described with reference to FIGS. 10 to 13.

At 1515, the UE or base station may pass a third signal through a first bandpass filter configured to reject signals associated with the first frequency band. The operations of 1515 may be performed according to the methods described herein. In some examples, aspects of the operations of 1515 may be performed by a transmitter as described with reference to FIGS. 10 to 13.

At 1520, the UE or base station may receive, at the set of patch radiators, the third signal having the first polarization and associated with a second frequency band. The operations of 1520 may be performed according to the methods described herein. In some examples, aspects of the operations of 1520 may be performed by a transmitter as described with reference to FIGS. 10 to 13.

At 1525, the UE or base station may pass a fourth signal through a second bandpass filter configured to reject signals associated with the first frequency band. The operations of 1525 may be performed according to the methods described herein. In some examples, aspects of the operations of 1525 may be performed by a transmitter as described with reference to FIGS. 10 to 13.

At 1530, the UE or base station may receive, at the set of patch radiators, the fourth signal having the second polarization and associated with the second frequency band. The operations of 1530 may be performed according to the methods described herein. In some examples, aspects of the operations of 1530 may be performed by a transmitter as described with reference to FIGS. 10 to 13.

At 1535, the UE or base station may transmit, using the set of patch radiators, a signal based on the first signal and the second signal (e.g., a low-band signal), the third signal and the fourth signal (e.g., a high-band signal), or a combination thereof (e.g., a dual-band signal). The operations of 1535 may be performed according to the methods described herein. In some examples, aspects of the operations of 1535 may be performed by a transmitter as described with reference to FIGS. 10 to 13.

Figure 16:
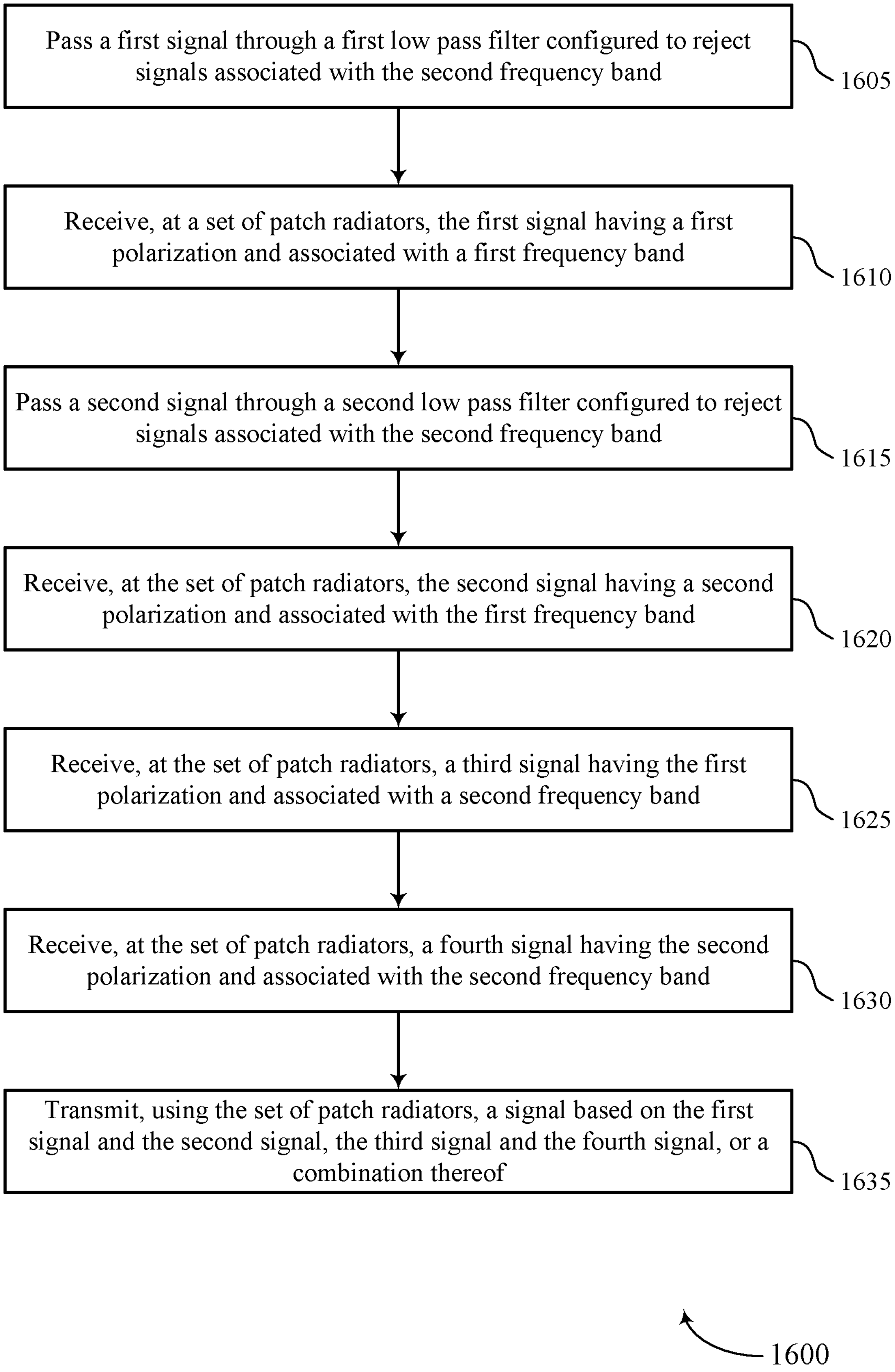

FIG. 16 shows a flowchart illustrating a method 1600 that supports dual-band and dual-polarization patch radiator array in accordance with aspects of the present disclosure. The operations of method 1600 may be implemented by a UE 115 or base station 105 or its components as described herein. For example, the operations of method 1600 may be performed by a communications manager and a transmitter as described with reference to FIGS. 10 to 13. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may pass a first signal through a first low pass filter configured to reject signals associated with the second frequency band. The operations of 1605 may be performed according to the methods described herein. In some examples, aspects of the operations of 1605 may be performed by a transmitter as described with reference to FIGS. 10 to 13.

At 1610, the UE or base station may receive, at a set of patch radiators, the first signal having a first polarization and associated with a first frequency band. The operations of 1610 may be performed according to the methods described herein. In some examples, aspects of the operations of 1610 may be performed by a transmitter as described with reference to FIGS. 10 to 13.

At 1615, the UE or base station may pass a second signal through a second low pass filter configured to reject signals associated with the second frequency band. The operations of 1615 may be performed according to the methods described herein. In some examples, aspects of the operations of 1615 may be performed by a transmitter as described with reference to FIGS. 10 to 13.

At 1620, the UE or base station may receive, at the set of patch radiators, the second signal having a second polarization and associated with the first frequency band. The operations of 1620 may be performed according to the methods described herein. In some examples, aspects of the operations of 1620 may be performed by a transmitter as described with reference to FIGS. 10 to 13.

At 1625, the UE or base station may receive, at the set of patch radiators, a third signal having the first polarization and associated with a second frequency band. The operations of 1625 may be performed according to the methods described herein. In some examples, aspects of the operations of 1625 may be performed by a transmitter as described with reference to FIGS. 10 to 13.

At 1630, the UE or base station may receive, at the set of patch radiators, a fourth signal having the second polarization and associated with the second frequency band. The operations of 1630 may be performed according to the methods described herein. In some examples, aspects of the operations of 1630 may be performed by a transmitter as described with reference to FIGS. 10 to 13.

At 1635, the UE or base station may transmit, using the set of patch radiators, a signal based on the first signal and the second signal (e.g., a low-band signal), the third signal and the fourth signal (e.g., a high-band signal), or a combination thereof (e.g., a dual-band signal). The operations of 1635 may be performed according to the methods described herein. In some examples, aspects of the operations of 1635 may be performed by a transmitter as described with reference to FIGS. 10 to 13.

Figure 17:
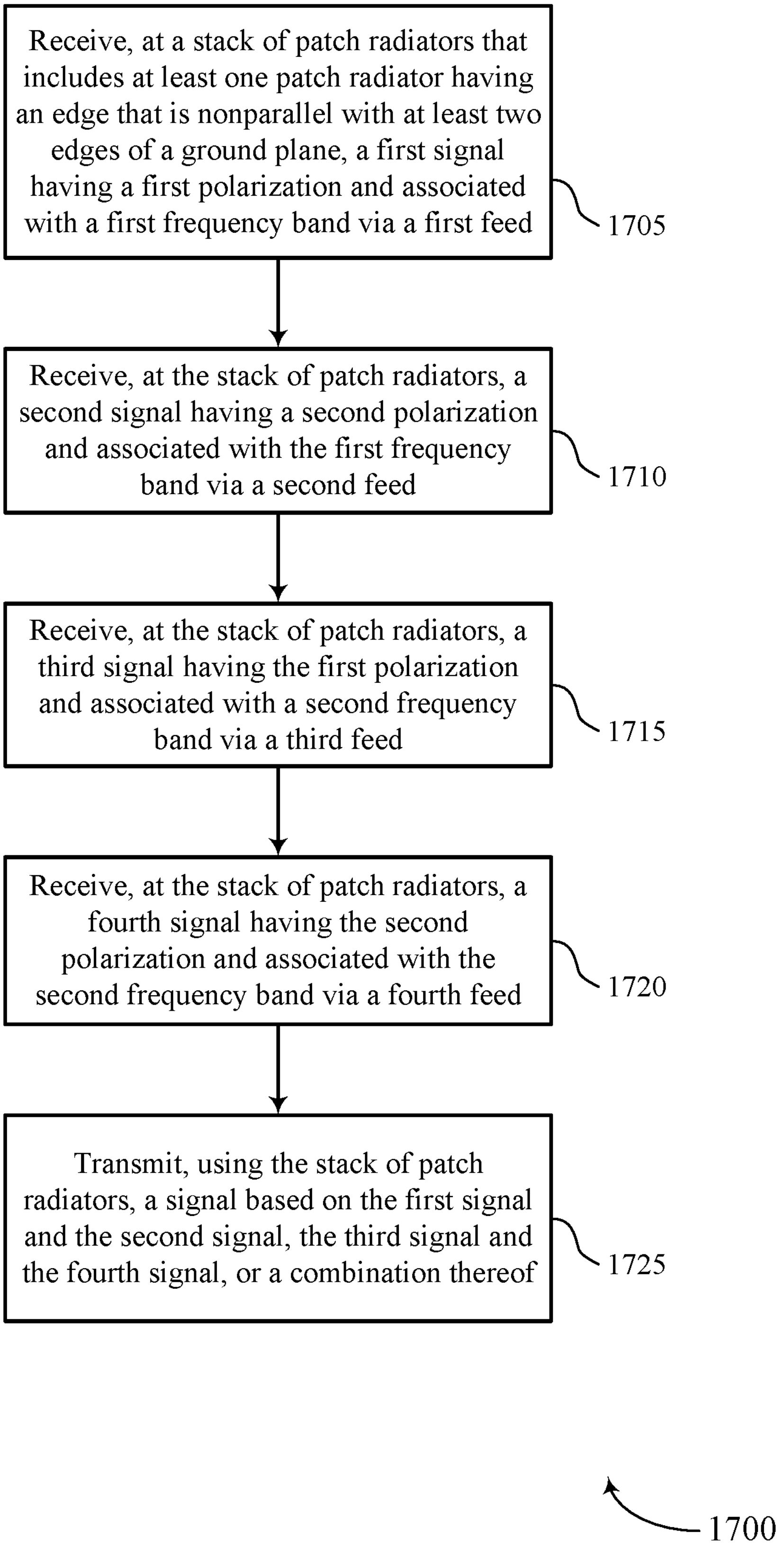

FIG. 17 shows a flowchart illustrating a method 1700 that supports dual-band and dual-polarization patch radiator array in accordance with aspects of the present disclosure. The operations of method 1700 may be implemented by a UE 115 or base station 105 or its components as described herein. For example, the operations of method 1700 may be performed by a communications manager and a transmitter as described with reference to FIGS. 10 to 13. In some examples, a UE or base station may execute a set of instructions to control the functional elements of the UE or base station to perform the functions described below.

Additionally or alternatively, a UE or base station may perform aspects of the functions described below using special-purpose hardware.

At 1705, the UE or base station may receive, at a stack of patch radiators that includes at least one patch radiator having an edge that is nonparallel with at least two edges of a ground plane, a first signal having a first polarization and associated with a first frequency band via a first feed. The operations of 1705 may be performed according to the methods described herein. In some examples, aspects of the operations of 1705 may be performed by a transmitter as described with reference to FIGS. 10 to 13.

At 1710, the UE or base station may receive, at the stack of patch radiators, a second signal having a second polarization and associated with the first frequency band via a second feed. The operations of 1710 may be performed according to the methods described herein. In some examples, aspects of the operations of 1710 may be performed by a transmitter as described with reference to FIGS. 10 to 13.

At 1715, the UE or base station may at the stack of patch radiators, a third signal having the first polarization and associated with a second frequency band via a third feed. The operations of 1715 may be performed according to the methods described herein. In some examples, aspects of the operations of 1715 may be performed by a transmitter as described with reference to FIGS. 10 to 13.

At 1720, the UE or base station may receive, at the stack of patch radiators, a fourth signal having the second polarization and associated with the second frequency band via a fourth feed. The operations of 1720 may be performed according to the methods described herein. In some examples, aspects of the operations of 1720 may be performed by a transmitter as described with reference to FIGS. 10 to 13.

At 1725, the UE or base station may transmit, using the stack of patch radiators, a signal based on the first signal and the second signal, the third signal and the fourth signal, or a combination thereof. The operations of 1725 may be performed according to the methods described herein. In some examples, aspects of the operations of 1725 may be performed by a transmitter as described with reference to FIGS. 10 to 13

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An antenna system, comprising:

a ground plane at a first layer of a printed circuit board (PCB), wherein a first edge of the ground plane is perpendicular to and longer than a second edge of the ground plane;

a phased array comprising an array of radiator stacks overlapping the ground plane, wherein a first radiator stack in the array comprises a first radiator at a second layer of the PCB, the first radiator having a first edge that is parallel with the first edge of the ground plane and a second edge that is parallel with the second edge of the ground plane, and wherein the first radiator stack further comprises a second radiator at a third layer of the PCB, the second radiator having a first edge that is nonparallel with the first edge of the ground plane and with the second edge of the ground plane;

a first feed and a second feed coupled to the first radiator, the first feed configured for signals having a first polarization, the second feed configured for signals having a second polarization; and a third feed and a fourth feed coupled to the second radiator, the third feed configured for signals having the first polarization, the fourth feed configured for signals having the second polarization, wherein the array of radiator stacks comprises a second radiator stack, a third radiator stack and a fourth radiator stack, each comprising a radiator having a first edge that is parallel with the first edge of the ground plane and a second edge that is parallel with the second edge of the ground plane, and each comprising another radiator having a first edge that is nonparallel with the first edge of the ground plane and with the second edge of the ground plane.

2. The antenna system of claim 1, wherein the first edge of the first radiator is parallel with a third edge of the ground plane, and the second edge of the first radiator is parallel with a fourth edge of the ground plane.

3. The antenna system of claim 2, wherein the first radiator further has a third edge that is parallel with the first edge of the ground plane and the third edge of the ground plane, and wherein the first radiator further has a fourth edge that is parallel with the second edge of the ground plane and the fourth edge of the ground plane.

4. The antenna system of claim 3, wherein the first edge of the first radiator is a portion of the first radiator closest to the first edge of the ground plane, wherein the second edge of the first radiator is a portion of the first radiator closest to the second edge of the ground plane, wherein the third edge of the first radiator is a portion of the first radiator closest to the third edge of the ground plane, and wherein the fourth edge of the first radiator is a portion of the first radiator closest to the fourth edge of the ground plane.

5. The antenna system of claim 1, wherein the second radiator has a second edge that is nonparallel with the first edge of the ground plane and with the second edge of the ground plane.

6. The antenna system of claim 5, wherein the first edge of the second radiator is nonparallel with a third edge of the ground plane and with a fourth edge of the ground plane, and wherein the second edge of the second radiator is nonparallel with the third edge of the ground plane and with the fourth edge of the ground plane.

7. The antenna system of claim 6, wherein the second radiator further has a third edge that is nonparallel with the first, second, third, and fourth edges of the ground plane, and wherein the second radiator further has a fourth edge that is nonparallel with the first, second, third, and fourth edges of the ground plane.

8. The antenna system of claim 7, wherein the first edge of the first radiator is parallel with the third edge of the ground plane, wherein the second edge of the first radiator is parallel with the fourth edge of the ground plane, wherein the first radiator further has a third edge that is parallel with the first edge of the ground plane and the third edge of the ground plane, and wherein the first radiator further has a fourth edge that is parallel with the second edge of the ground plane and the fourth edge of the ground plane.

9. The antenna system of claim 8, wherein the first radiator is configured to radiate signals in a first frequency band, and wherein the second radiator is configured to radiate signals in a second frequency band which does not overlap the first frequency band.

10. The antenna system of claim 1, wherein the first radiator and the second radiator are configured to radiate signals in a millimeter band.

11. The antenna system of claim 1, wherein the first radiator is configured to radiate signals in a first frequency band, and wherein the second radiator is configured to radiate signals in a second frequency band which is spaced from the first frequency band.

12. The antenna system of claim 1, wherein the first edge of the second radiator is oriented at a forty-five (45) degree angle relative to the first edge of the ground plane and relative to the second edge of the ground plane.

13. The antenna system of claim 1, wherein each radiator in each of the second radiator stack, third radiator stack, and fourth radiator stack is configured to radiate signals in the first polarization and the second polarization.

14. The antenna system of claim 1, wherein the first polarization and the second polarization are orthogonal.

15. The antenna system of claim 1, wherein the ground plane is spaced from the second layer in a first direction, and wherein the first radiator is configured to capacitively couple to a patch in a layer of the PCB spaced from the second layer in a second direction opposite the first direction.

16. The antenna system of claim 1, wherein the first edge and the second edge of the first radiator are each shorter than the first edge of the second radiator, and wherein the second layer is disposed between the first layer and the third layer.

17. The antenna system of claim 1, wherein an axis through a center of the first radiator and a center of the second radiator is orthogonal to the ground plane.

18. The antenna system of claim 1, wherein the first edge and the second edge of the first radiator are on a periphery of the first radiator, and wherein the first edge of the second radiator is on a periphery of the second radiator.

19. An antenna system, comprising:

a ground plane at a first layer of a printed circuit board (PCB), wherein a first edge of the ground plane is perpendicular to and longer than a second edge of the ground plane;

a phased array comprising an array of radiator stacks overlapping the ground plane, wherein a first radiator stack in the array comprises a first radiator at a second layer of the PCB, the first radiator having a first edge that is parallel with the first edge of the ground plane and a second edge that is parallel with the second edge of the ground plane, and wherein the first radiator stack further comprises a second radiator at a third layer of the PCB, the second radiator having a first edge that is nonparallel with the first edge of the ground plane and with the second edge of the ground plane;

a first feed and a second feed coupled to the first radiator, the first feed configured for signals having a first polarization, the second feed configured for signals having a second polarization; and a third feed and a fourth feed coupled to the second radiator, the third feed configured for signals having the first polarization, the fourth feed configured for signals having the second polarization, wherein the first radiator is configured to radiate signals in a first frequency band, and wherein the second radiator is configured to radiate signals in a second frequency band which is spaced from the first frequency band by more than 7 GHz.

20. An antenna system, comprising:

a ground plane at a first layer of a printed circuit board (PCB), wherein a first edge of the ground plane is perpendicular to and longer than a second edge of the ground plane; and a phased array comprising an array of radiator stacks overlapping the ground plane, wherein a first radiator stack in the array comprises a first radiator at a second layer of the PCB and a second radiator at a third layer of the PCB, the first radiator having a first edge that is nonparallel with the first edge of the ground plane and with the second edge of the ground plane, and wherein a second radiator stack in the array is spaced from the first radiator stack and rotated relative to the first radiator stack, the second radiator stack comprising a third radiator at the second layer of the PCB and a fourth radiator at the third layer of the PCB, the third radiator having a first edge that is nonparallel with the first edge of the ground plane and with the second edge of the ground plane.

* * * * *